US009955623B2

(12) United States Patent
Sauder et al.

(10) Patent No.: US 9,955,623 B2
(45) Date of Patent: *May 1, 2018

(54) APPARATUS, SYSTEMS AND METHODS FOR ROW UNIT DOWNFORCE CONTROL

(71) Applicant: Precision Planting LLC, Tremont, IL (US)

(72) Inventors: Derek A. Sauder, Tremont, IL (US); Ian R. Radtke, Washington, IL (US); Jason J. Stoller, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/047,221

(22) Filed: Feb. 18, 2016

(65) Prior Publication Data

US 2016/0157412 A1   Jun. 9, 2016

Related U.S. Application Data

(63) Continuation of application No. 14/237,231, filed as application No. PCT/US2012/049747 on Aug. 6, 2012, now Pat. No. 9,288,937.
(Continued)

(51) Int. Cl.
*A01B 63/114* (2006.01)
*A01C 7/18* (2006.01)
(Continued)

(52) U.S. Cl.
CPC ............ *A01B 63/114* (2013.01); *A01B 13/08* (2013.01); *A01C 5/06* (2013.01); *A01C 7/18* (2013.01); *A01C 7/205* (2013.01); *A01B 63/111* (2013.01)

(58) Field of Classification Search
CPC ....... A01B 13/08; A01B 13/00; A01B 63/114; A01B 63/111; A01B 63/10; A01B 63/02;
(Continued)

(56) References Cited

U.S. PATENT DOCUMENTS

| 4,648,466 A | 3/1987 | Baker et al. |
| 5,065,681 A | 11/1991 | Hadley |

(Continued)

FOREIGN PATENT DOCUMENTS

| DE | 4123836 C1 | 12/1992 |
| DE | 10330869 A1 | 2/2005 |

(Continued)

OTHER PUBLICATIONS

Extended European Search Report, Oct. 7, 2016, 8 pages.
(Continued)

*Primary Examiner* — Christopher J. Novosad
(74) *Attorney, Agent, or Firm* — Thomas J. Oppold; Larkin Hoffman Daly & Lindgren, Ltd.

(57) ABSTRACT

Systems, methods and apparatus for controlling the downforce applied to a row unit of an agricultural implement having multiple row units. A downpressure control device in fluid communication with a down chamber of the least one actuator maintains as a selected downpressure, any one of a continuous range of pressures in the downpressure chamber. A lift pressure control device in fluid communication with a lift chamber of the at least one actuator for controlling pressure in the lift chamber maintains as a selected lift pressure, any one of a continuous range of pressures in the lift chamber.

20 Claims, 18 Drawing Sheets

Related U.S. Application Data

(60) Provisional application No. 61/515,700, filed on Aug. 5, 2011.

(51) Int. Cl.
    *A01C 7/20*         (2006.01)
    *A01B 13/08*      (2006.01)
    *A01C 5/06*         (2006.01)
    *A01B 63/111*     (2006.01)

(58) Field of Classification Search
    CPC .. A01B 63/00; A01C 5/06; A01C 5/00; A01C 7/18; A01C 7/205; A01C 7/201; A01C 7/20
    USPC ................ 111/137; 172/4, 411, 318; 701/50
    See application file for complete search history.

(56) References Cited

U.S. PATENT DOCUMENTS

| | | | |
|---|---|---|---|
| 5,235,922 | A | 8/1993 | Deckler |
| 6,389,999 | B1 | 5/2002 | Duello |
| 8,857,530 | B2 | 10/2014 | Henry |
| 9,288,937 | B2 * | 3/2016 | Sauder ............... A01C 7/205 |
| 2003/0159577 | A1 | 8/2003 | Pfaff et al. |
| 2005/0044849 | A1 | 3/2005 | Berthod et al. |
| 2010/0010667 | A1 | 1/2010 | Sauder et al. |
| 2010/0180695 | A1 | 7/2010 | Sauder et al. |
| 2010/0198529 | A1 | 8/2010 | Sauder et al. |

FOREIGN PATENT DOCUMENTS

| | | |
|---|---|---|
| DE | 102006057782 A1 | 6/2008 |
| EP | 0063025 A1 | 10/1982 |
| EP | 2025215 B1 | 3/2011 |

OTHER PUBLICATIONS

Applicant's Response to the Opposition filed with the European Patent Office dated Oct. 4, 2017.
Notice of Opposition from Amazonen-Werke H. Dreyer GmbH & Co. KG filed with the European Patent Office dated Apr. 20, 2017.
English Translation of the Opposition from Amazonen-Werke H. Dreyer GmbH & Co. KG filed with the European Patent Office dated Apr. 20, 2017.

\* cited by examiner

APPARATUS, SYSTEMS AND METHODS FOR ROW UNIT DOWNFORCE CONTROL

CROSS-REFERENCE TO RELATED APPLICATIONS

This application is a continuation of U.S. application Ser. No. 14/237,231 filed Feb. 5, 2014 which is the National Stage of International Application No. PCT/US2012/049747 filed Aug. 6, 2012, which claims the benefit of U.S. Provisional Application No. 61/515,700, filed Aug. 5, 2011.

BACKGROUND

It is recognized that sufficient downforce must be exerted on a planter row unit to ensure the desired furrow depth and soil compaction is achieved. If excessive downforce is applied, especially in soft or moist soils, the soil may be overly compacted which can affect the ability of germinating seeds to break through the soil. If insufficient downforce is applied, particularly in hard or dry soil, the planter may ride up and out of the soil resulting in insufficient depth of the furrow.

In the past, coiled springs extending between the parallel arms of the row units of the planter were often employed to provide the additional or "supplemental" downforce needed to ensure the desired furrow depth and soil compaction was achieved. By positioning the spring at various preset locations along the parallel arms, the amount of downforce exerted on the row unit could be increased or decreased. However, the amount of supplemental downforce exerted by the spring remained constant until the spring was repositioned. For example, when the planter encountered hard or dry soil such that greater supplemental downforce is necessary to maintain furrow depth or the desired soil compaction, the operator had to stop and adjust the location of the spring in order to increase the supplemental downforce. Furthermore, during operation, as the seed or fertilizer in the hoppers was dispensed, the weight of the row unit gradually decreased causing a corresponding reduction in the total downforce on the gauge wheels, because the supplemental downforce exerted by the spring remained substantially constant until the spring was manually repositioned.

More advanced supplemental downforce systems, such as disclosed in U.S. application Ser. No. 12/679,710 (Pub. No. US2010/0198529) by Sauder et al. (hereinafter "the Sauder '710 Application"), which is incorporated herein in its entirety by reference, measure the strain in a member of the gauge wheel adjusting mechanism to determine the force being exerted against the gauge wheels to determine the downforce. However, central control systems that apply a common supplemental downforce to each row unit often fail to respond to unique loads experienced by each row unit, such that insufficient or excessive supplemental downforce may be applied to any given row unit.

Thus, there is a need for a downforce control system that effectively maintains a desired downforce at each row unit of an agricultural implement having a plurality of row units.

DESCRIPTION

Row Unit Downforce System

Figure 1A:
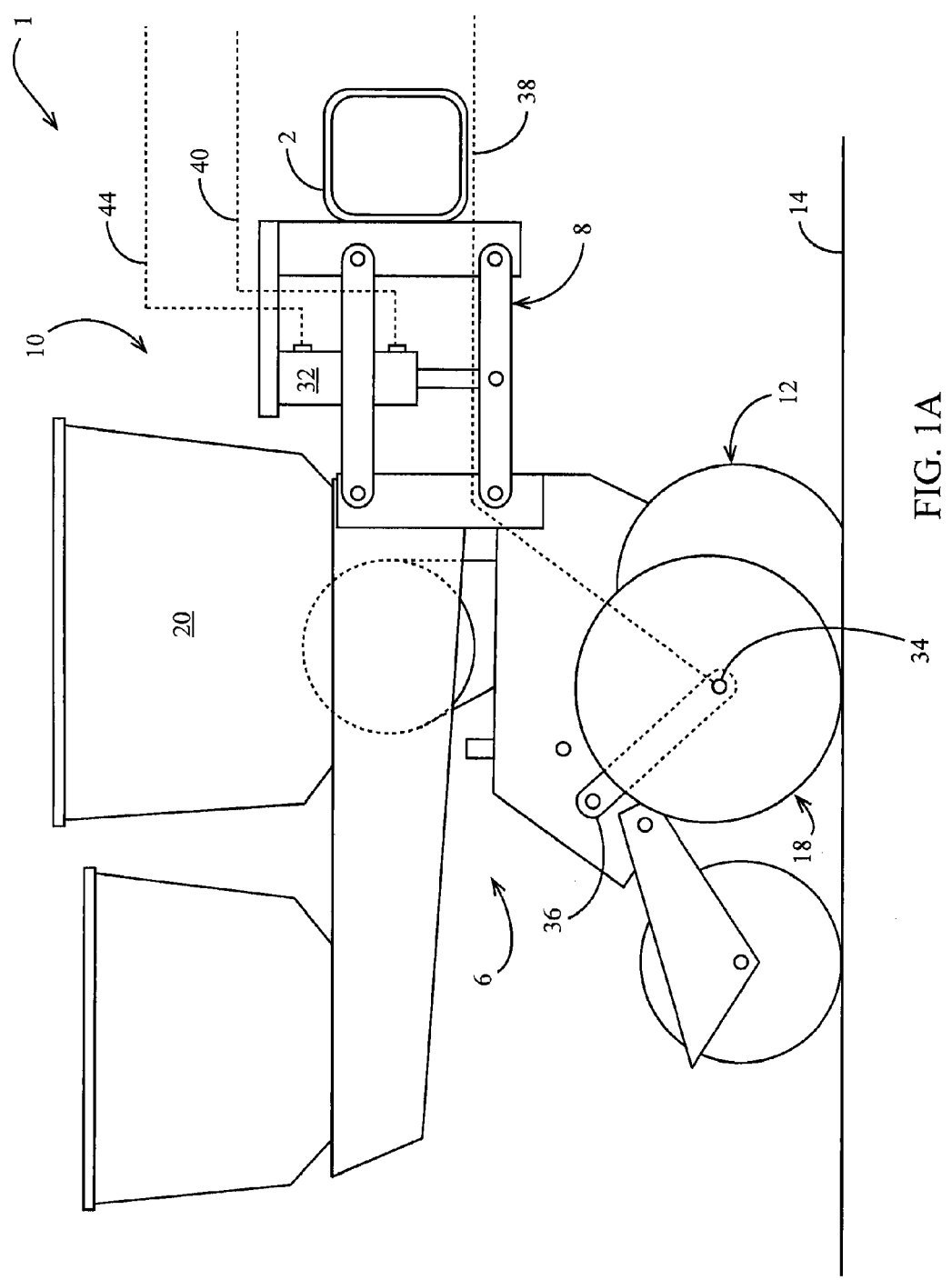
FIG. 1A is a side elevation view of an embodiment of a planter row unit.
Figure 2:
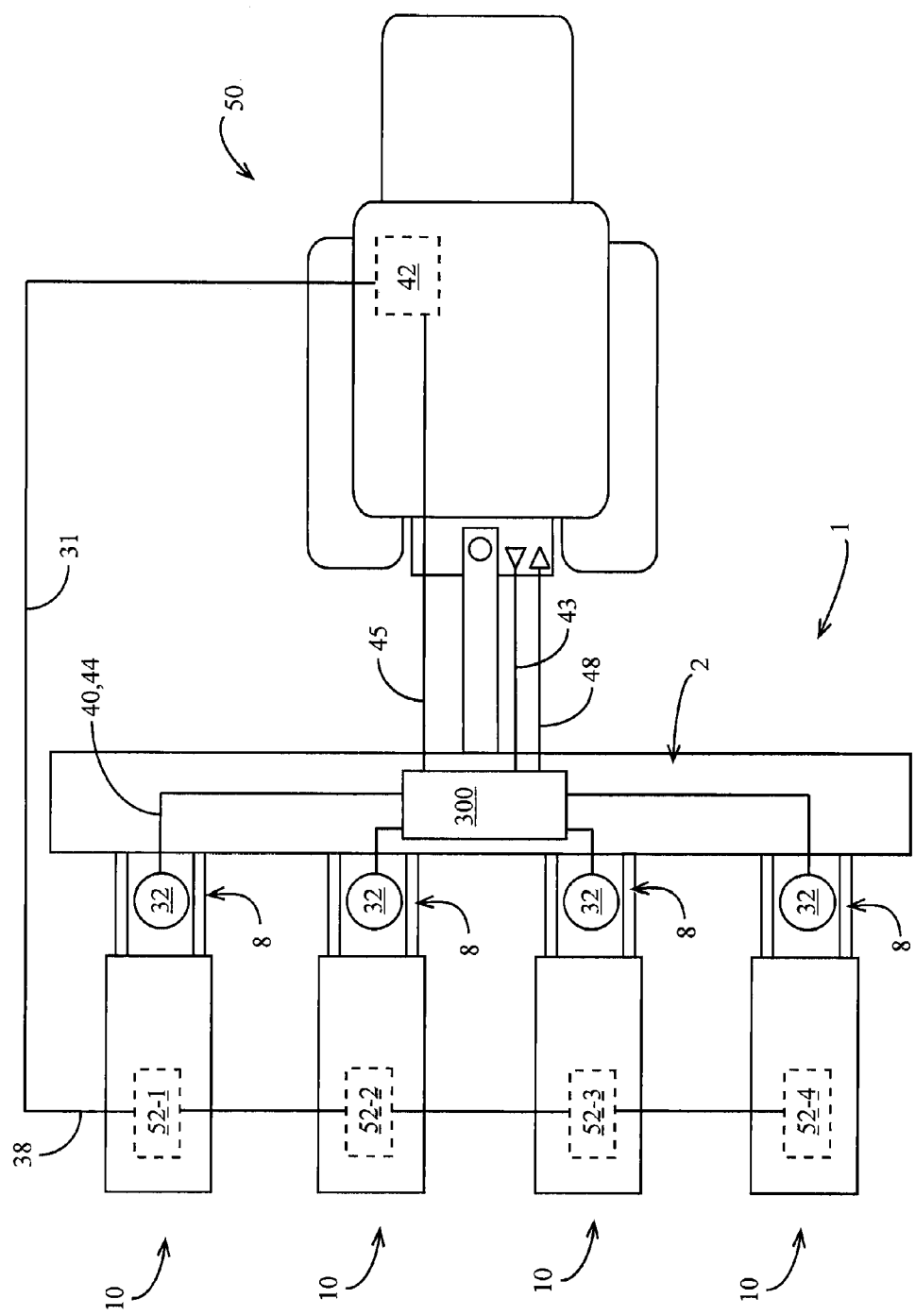
FIG. 2 is a top plan view of a tractor and the planter row unit of FIG. 1 schematically illustrating one embodiment of a downforce control system.

Referring to the drawings, wherein like reference numerals designate identical or corresponding parts throughout the several views, FIG. 1A illustrates a side elevation view of a row unit 10 of a planter 1. A top plan view of the planter 1 is shown in FIG. 2 with four row units 10 mounted in laterally spaced relation along the length of a toolbar 2 by parallel arm linkages 8 which permit each row unit to move vertically independently of one another and with respect to the toolbar 2. It should be understood that the planter 1 may comprise many more row units and thus the four-row planter of FIG. 2 is provided for illustration purposes only.

Each row unit 10 includes a row unit frame supporting one or more bins or hoppers 20 for holding seeds, insecticide or other crop inputs. Each row unit 10 includes opening discs 12 for opening a furrow or trench in the soil 14 as the planter is pulled through the field by a tractor 50. The depth of the trench is set by gauge wheels 18 which ride on the surface of the soil 14.

Figure 1B:
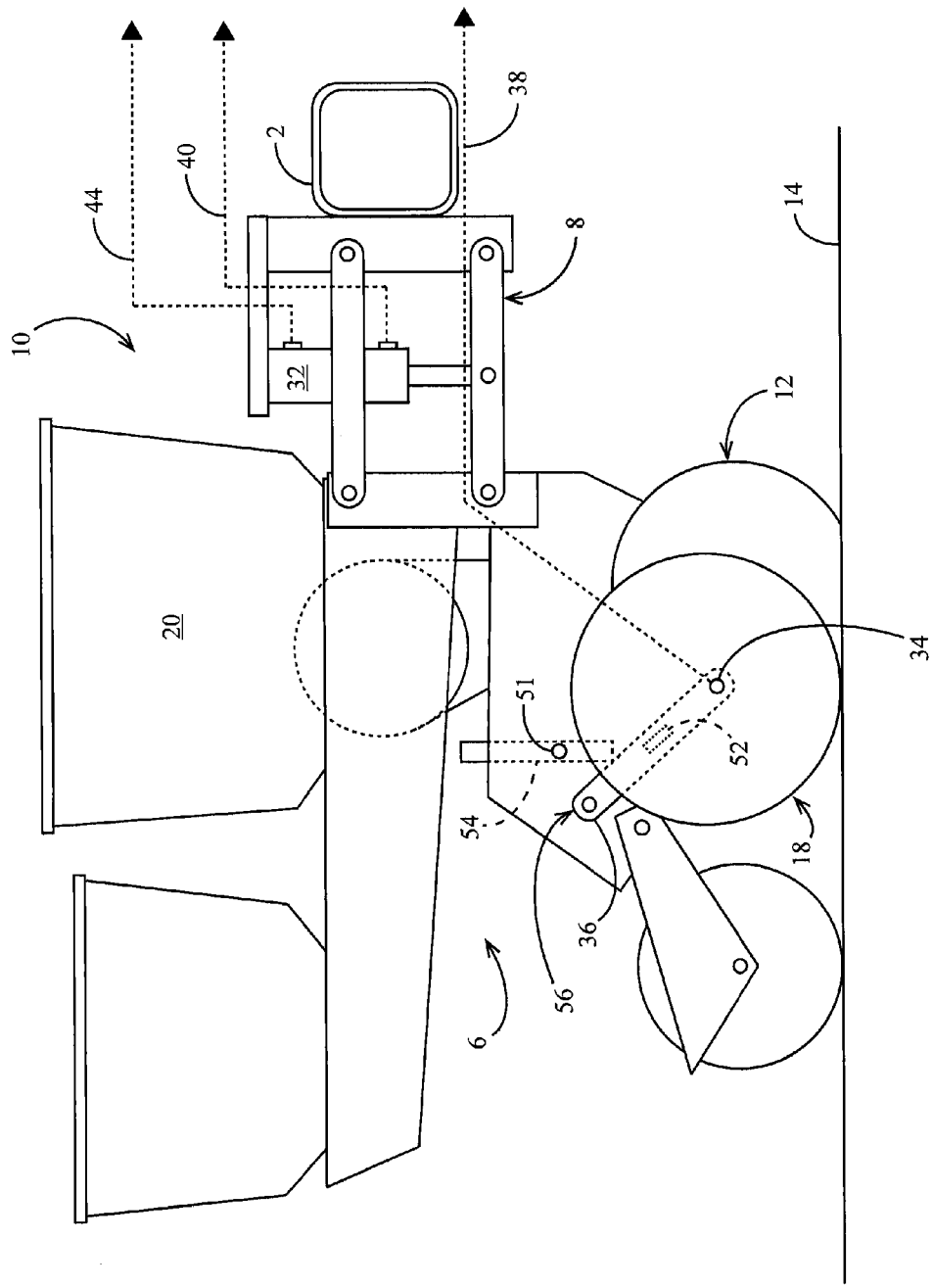
FIG. 1B is a side elevation view of the planter row unit of FIG. 1 with a depth regulating member being shown.

Turning to the view of FIG. 1B, the gauge wheels 18 are mounted to gauge wheel arms 36 at axles 34. Gauge wheel arms 36 are pivotally mounted to the frame 6 at a pivot point 56. A depth adjustment arm 54 is pivotally mounted to the frame 6 about a pin 51. The depth adjustment arm 54 contacts the gauge wheel arm 36, limiting the upward travel of the gauge wheels 18. The operator may rotate the depth adjustment arm 54 to adjust the position of the depth adjustment arm 54 and thus the maximum height of the gauge wheels 18 relative to the frame 6. It should be appreciated that other embodiments of the row unit 10 are known in the art, such as those including gauge wheels that "walk" over obstacles by means of a rocker as is disclosed in U.S. Pat. No. 5,235,922, incorporated herein in its entirety by reference.

Continuing to refer to FIG. 1B, each row unit 10 preferably incorporates a downforce sensor 52 for measuring a parameter related to the vertical force between the gauge wheels 18 and the surface of the soil 14 and generating a load signal related to such parameter. The sensor 52 may comprise any sensor configured to measure such parameter, including a strain gauge mounted to the gauge wheel arm 36 as illustrated in FIG. 1B and as disclosed in U.S. Pat. No. 6,701,857 to Jensen, incorporated herein in its entirety by reference. In other embodiments, the sensor 52 may comprise a load-sensing pin replacing the pin 51 as disclosed in U.S. patent publication no. US 2010/0180695, incorporated herein in its entirety by reference. As illustrated in FIG. 2, the signals from each of the sensors, 52-1, 52-2, 52-3, 52-4 are transmitted via a signal wire 38, which together comprise a signal harness 31, to the monitor 42 (FIG. 2) preferably located in the cab of the tractor 50. A preferred monitor 42 is disclosed in U.S. patent publication no. US 2010/0010667, incorporated herein in its entirety by reference. The monitor 42 preferably includes a processor, memory, and a graphical user interface ("GUI").

It should be appreciated that the force on the gauge wheels 18 represents the downforce on the row unit 10 in excess of the downforce required by the opening discs 12 to penetrate the soil 14 to a desired depth. Thus in operation, it is desirable to maintain a certain minimum threshold of force on gauge wheels 18 to ensure that the row unit is operating at the desired depth. However, it is desirable to keep the force on gauge wheels 18 below an upper threshold in order to minimize compaction and avoid pushing soil 14 in the direction of travel.

In order to assist in maintaining optimal levels of downforce, the row unit 10 is provided with an actuator 32. The actuator 32 is pivotally mounted at a first end to the toolbar 2 by a mounting bracket. The actuator 32 is pivotally mounted at a second end to one of the arms of the parallel linkage 8. A first fluid line 40 is in fluid communication with a lift chamber 35 (FIG. 3A) of the actuator 32. A second fluid line 44 is in fluid communication with a down chamber 33 (FIG. 3A) of the actuator 32. When the pressure in the down chamber 33 exceeds the pressure in the lift chamber 35, the actuator 32 exerts a downward force on the row unit 10, increasing the force on the gauge wheels 18. When the pressure in the lift chamber 35 exceeds the pressure in the down chamber 33, the actuator 32 exerts an upward force on the row unit 10, reducing the force on the gauge wheels 18.

A control system 300 is used to control the actuators 32. A fluid supply line 43 connects the control system 300 to a fluid supply port 376 (FIG. 3A) of a fluid reservoir (not shown) preferably mounted on the tractor 50. A fluid return line 48 connects the control system 300 to a fluid return port 374 (FIG. 3A) of the fluid reservoir. An actuator harness 45 connects the monitor 42 to the control system 300 for sending actuator command signals to each actuator 32 on each row unit 10.

Pressure Control System

Figure 3A:
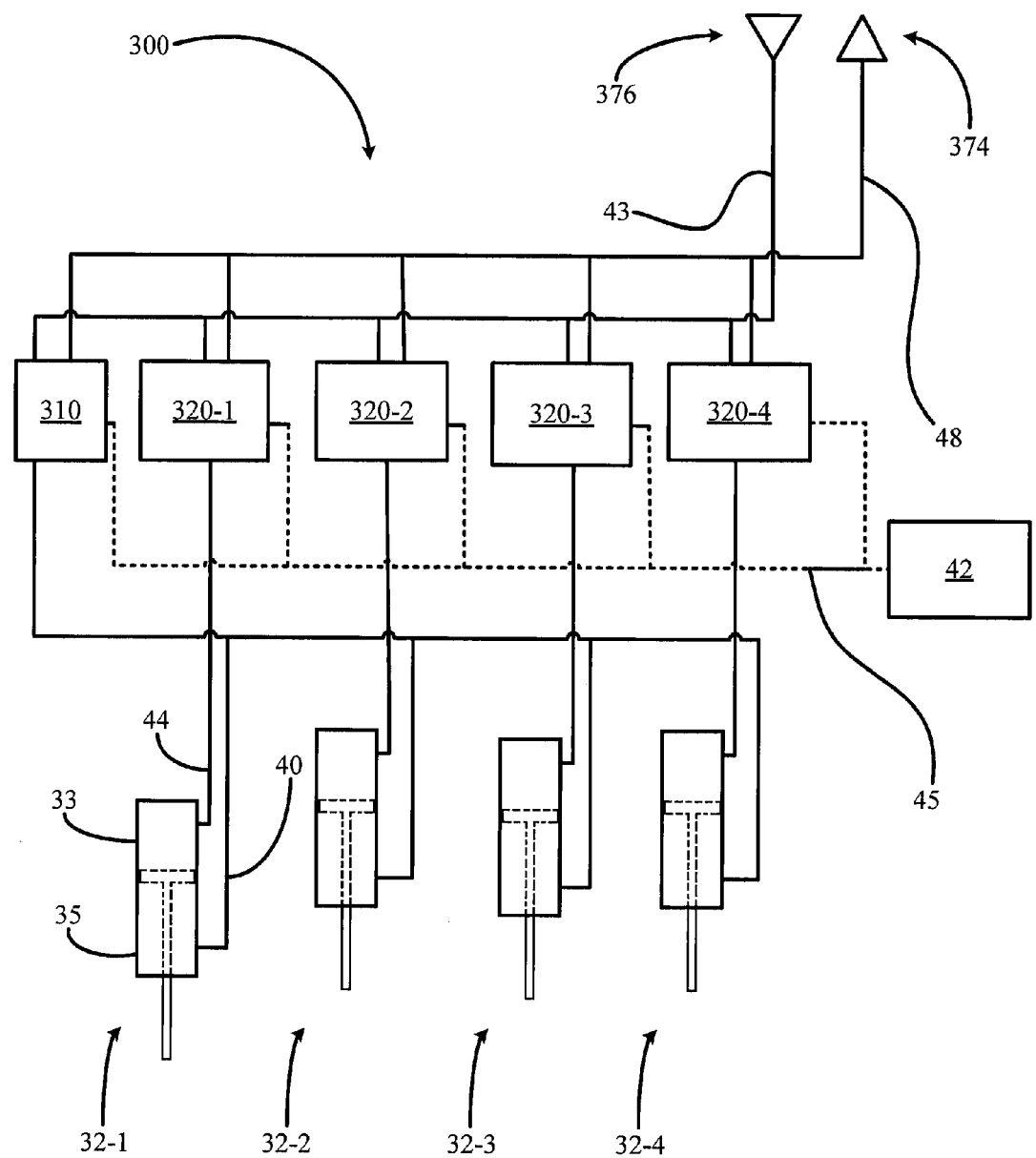
FIG. 3A is a more detailed schematic illustration of the downforce control system of FIG. 2.

One embodiment of control system 300 is illustrated schematically in FIG. 3A. The control system 300 includes a lift pressure control device 310 in fluid communication with the fluid supply line 43 and the fluid return line 48. The lift pressure control device 310 is in fluid communication with the lift chamber 35 of each actuator 32-1, 32-2, 32-3, 32-4. The control system 300 also includes down pressure control devices 320. Each down pressure control device 320-1, 320-2, 320-3, 320-4 is in fluid communication with the fluid supply line 43 and the fluid return line 48. Each down pressure control device 320-1 is in fluid communication with the down chamber 33 of a respective one of the actuators 32-1, 32-2, 32-3, 32-4. Monitor 42 is preferably in electrical communication with the each of the down pressure control devices 320 and with the lift pressure control device 310 via the actuator harness 45. The monitor 42 is preferably configured to modify an operating state of each control device 310, 320 (e.g., to change the pressure commanded by each control device).

In operation, the monitor 42 commands an individual down pressure to each down pressure control device 320 which then sets the commanded down pressure in the down chamber 33 of the associated actuator 32. The monitor 42 also commands a common lift pressure to the lift pressure control device 310 which then sets the commanded common lift pressure in the lift chambers 35 of each actuator 32.

Figure 3B:
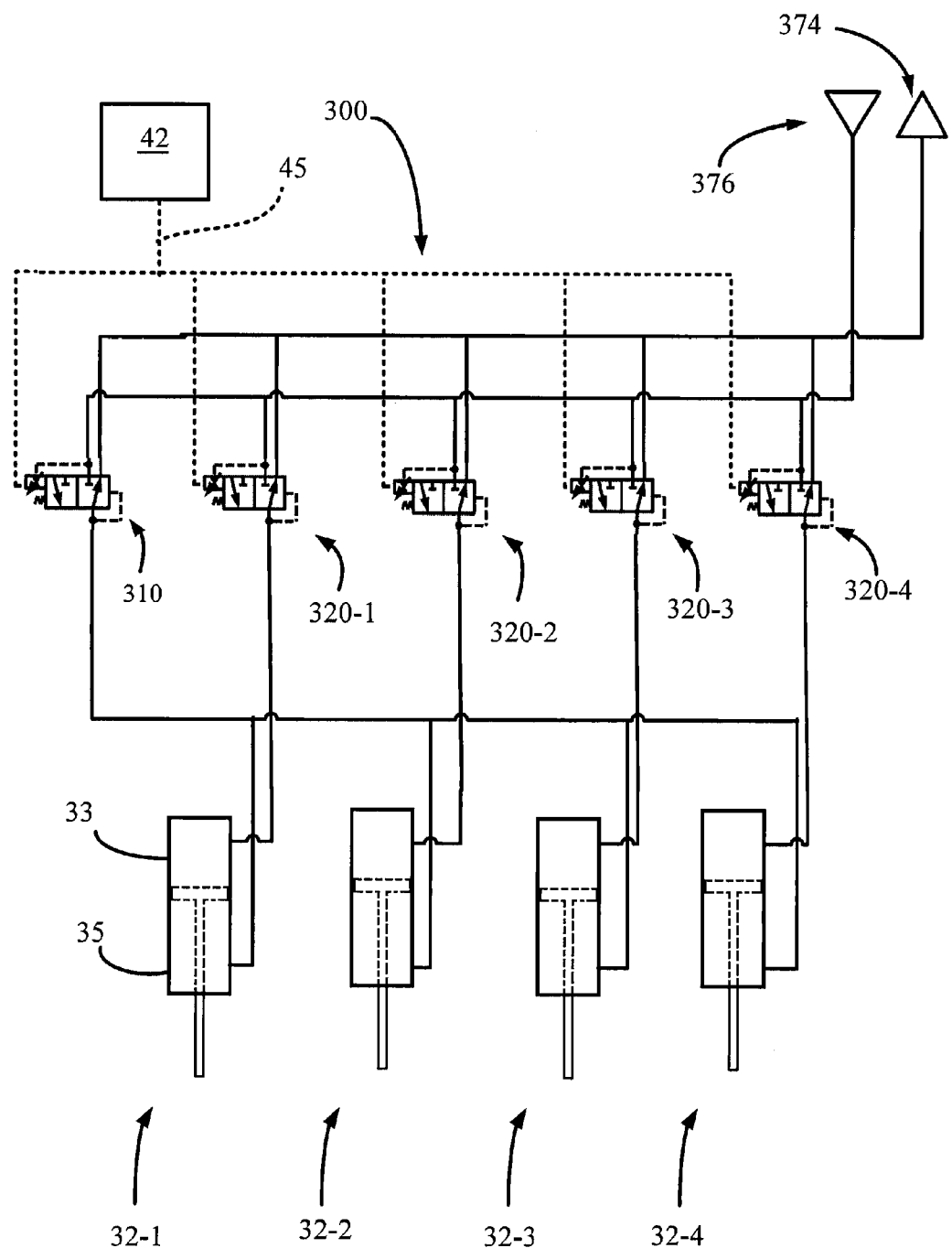
FIG. 3B is a schematic illustration of another embodiment of a downforce control system.

In the embodiment illustrated in FIG. 3B, the lift pressure control device 310 and the down pressure control devices 320 comprise pressure reducing-relieving valves such as Model No. TS10-36 manufactured by HydraForce in Lincolnshire, Ill. In such an embodiment, the fluid supply line 43 and the fluid return line 48 are in fluid communication with the pressure and tank ports, respectively, of each valve, and the work port of each valve is connected to the associated actuator 32. The monitor 42 is in electrical communication with a solenoid associated with each valve. In operation, the monitor 42 sends an individual control current to each valve and each valve sets a pressure proportional to the associated control current.

Control Processes

Because the lift pressure in the control system 300 is common to all rows, a process of controlling such a system preferably sets an appropriate lift pressure based on the down pressure being applied at every row. Such a process preferably minimizes the occurrence of lost planting depth at any row and preferably minimizes the occurrence of excess downforce at any row.

Figure 4A:
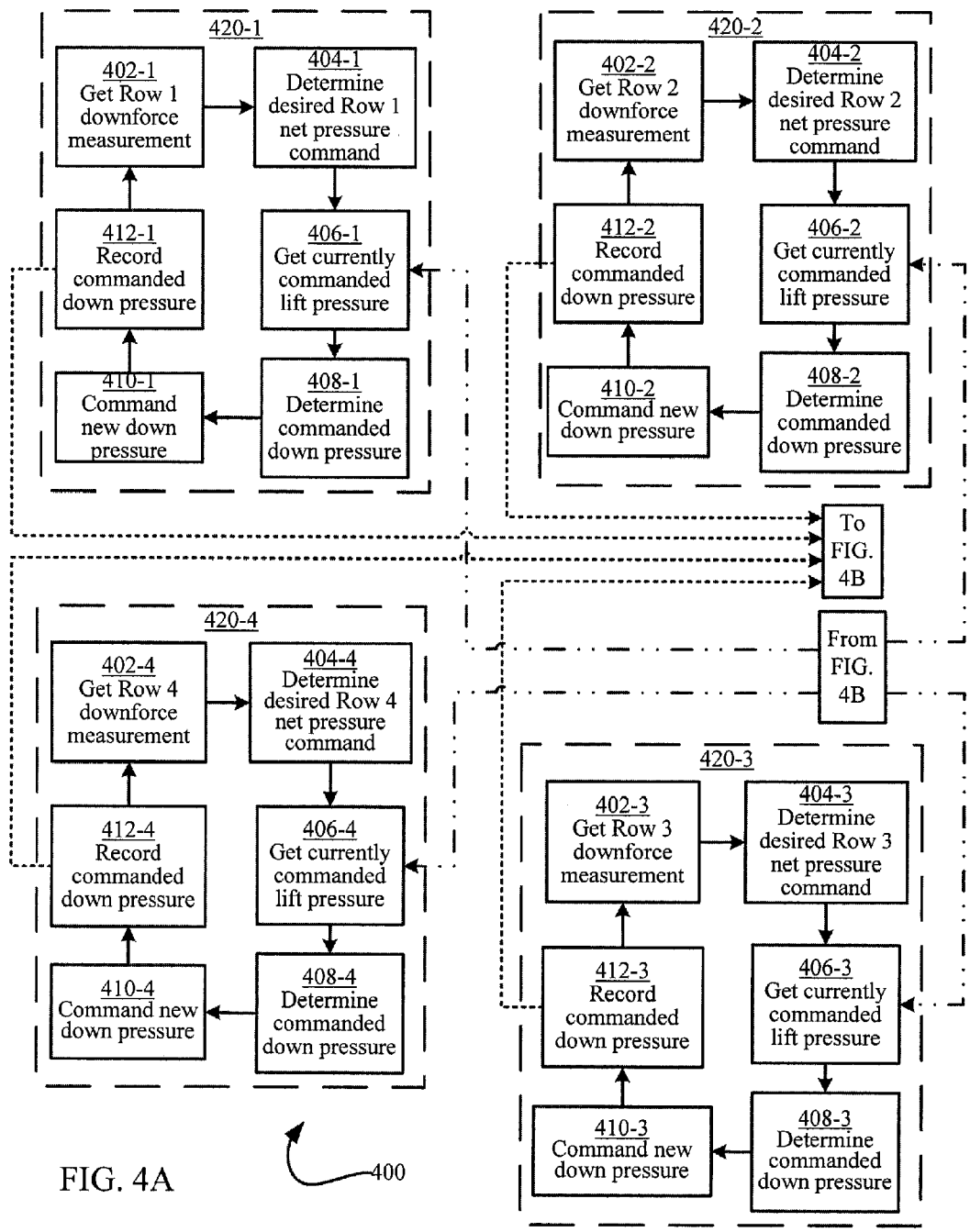
FIG. 4A illustrates an embodiment of a process flow for determining a down pressure.
Figure 4B:
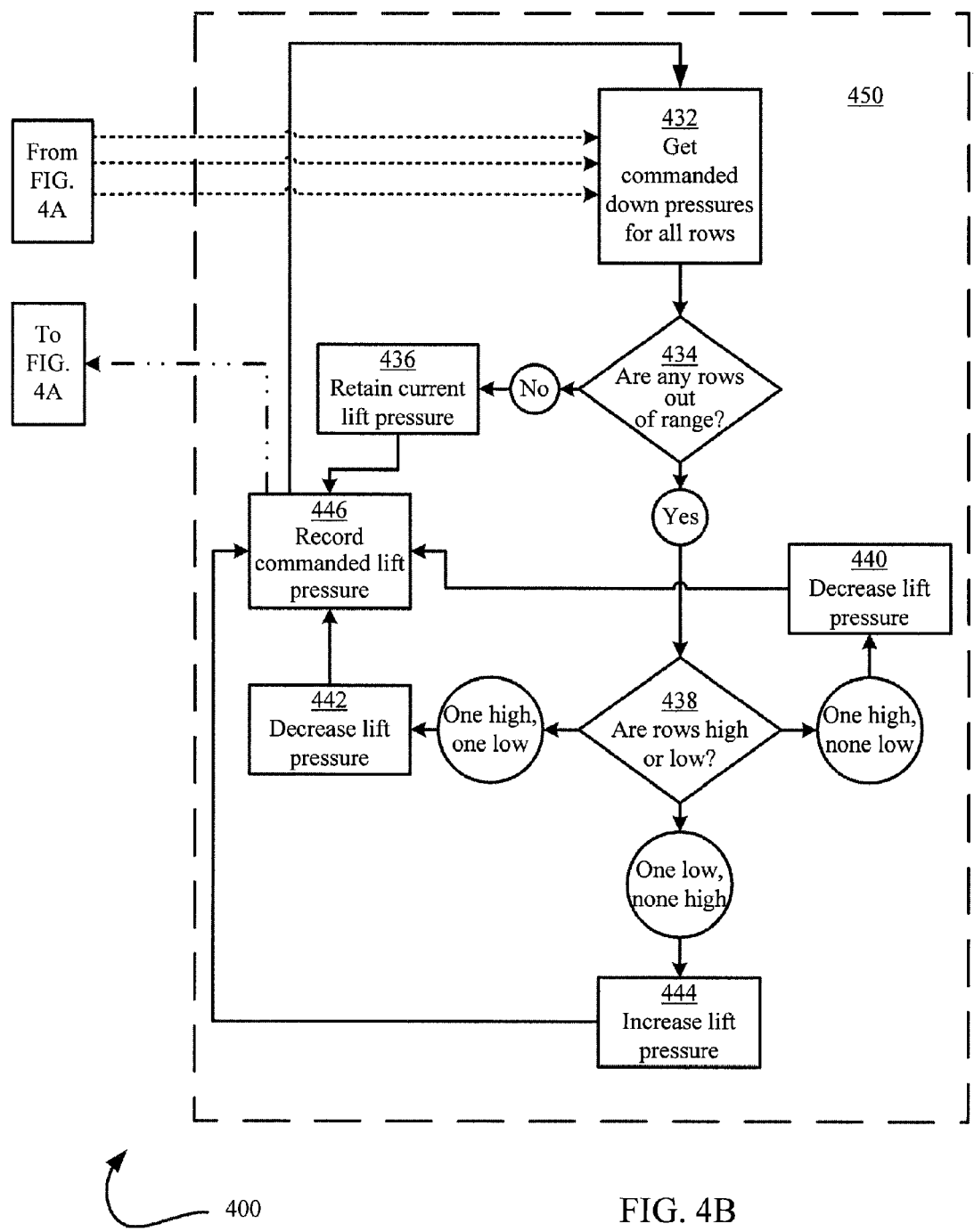
FIG. 4B illustrates an embodiment of a process flow for determining a lift pressure.

A preferred process 400 of determining and setting the desired down pressure and lift pressure in actuators 32 is illustrated in FIGS. 4A-4B. The process 400 includes processes 420 for determining and commanding the desired down pressure for each row unit 10 and a process 450 for determining and commanding the desired common lift pressure for all row units.

Referring to FIG. 4A, a separate process 420 is used for each row in order to determine the individual down pressure to command to each actuator 32. At step 402, the monitor 42 obtains the current downforce measurement for the row from the associated sensor 52. At step 404, the monitor 42 preferably determines a desired net pressure preferably based on the current downforce measurement. The desired net pressure is the desired sum of the down pressure in the down chamber 33 less the lift pressure in the lift chamber 35. In order to determine the down pressure required to obtain the desired net pressure, the monitor 42 preferably obtains the currently commanded lift pressure at step 406. The currently commanded lift pressure is preferably stored in memory by process 450, as described herein with respect to FIG. 4B. At step 408, the monitor 42 determines a commanded down pressure based on the currently commanded lift pressure and the desired net pressure. At step 410, the monitor 42 sends a command signal to the down pressure control device 320 related to the commanded down pressure. At step 412, the monitor 42 preferably stores the new commanded down pressure in memory.

Turning to FIG. 4B, a process 450 preferably compares the current down pressure at every row to a desired range and then determines an appropriate common lift pressure to command to the actuators 32 based on those comparisons. One embodiment of a desired down pressure range 480 is illustrated in FIG. 4D. As illustrated, each down pressure chamber has a maximum operating pressure 472. In the illustrated embodiment, the maximum operating pressure 472 is approximately 3000 psi. It should be appreciated in light of this disclosure that if the monitor 42 is commanding a negative down pressure in one row, then the process 420 has determined that that row needs more lift pressure than what is being provided by the lift chamber; i.e., the excess downforce is too high. Thus, the desired range 480 preferably has a minimum 484 approximately equal to zero. Contrarily, if the monitor 42 is commanding a down pressure greater than the maximum operating pressure of the down chamber, then the lift pressure needs to be reduced in order to maintain depth at that row. Thus, the desired range 480 has a maximum 482 approximately equal to the maximum operating pressure 472.

It should also be appreciated that because hydraulic systems take a certain amount of time to react to commands, it may be desirable to begin to modify the lift pressure as the down pressure in a given row approaches either zero or the maximum operating pressure of the down chamber. Thus, a second embodiment of a desired down pressure range 490 is illustrated in FIG. 4D. The desired range 490 has a maximum 492 which is less than the maximum operating pressure 472 by an upper band 495. The desired range 490 has a minimum 494 which is greater than the maximum operating pressure 472 by a lower band 493. The magnitudes of the lower band 493 and the upper band 495 are chosen to allow the control system 300 to proactively change the lift pressure without making unnecessary or too-frequent changes to the lift pressure.

Thus, returning to FIG. 4B and the process 450 for determining lift pressure, the monitor 42 obtains the currently commanded down pressure for each row at step 432. The currently commanded down pressure is preferably stored in memory by the process 420 as discussed herein with respect to FIG. 4A. At step 434, the monitor 42 determines whether the down pressure in any of the actuators 32 is outside of a desired range. If the down pressure is within the desired range for all actuators, then at step 436 the monitor 42 preferably retains the currently commanded lift pressure and at step 446 preferably stores the currently commanded lift pressure in memory.

If the down pressure is outside the desired range for at least one actuator, then at step 438 the monitor 42 determines whether one or more rows are above or below the desired range. If at least one row is above the desired range and no rows are below the desired range, then at step 440 the monitor 42 preferably commands a decrease in lift pressure and at step 446 preferably stores the new commanded lift pressure in memory. If at least one row is below the desired range and no rows are above the desired range, then at step 444 the monitor 42 preferably commands an increase in lift pressure and at step 446 preferably stores the new commanded lift pressure in memory. If at least one row is above the desired range and at least one row is below the desired range, then at step 442 the monitor 42 preferably commands a decrease in lift pressure and at step 446 preferably stores the new commanded lift pressure in memory. Decreasing the lift pressure at step 442 is preferable because where a first row has excess down pressure and a second row has insufficient down pressure, the potential economic cost to the first row (due to losing depth and potentially placing seeds on top of the soil) is generally greater than the potential economic cost to the second row (due to excess soil compaction or poor trench definition).

Figure 4C:
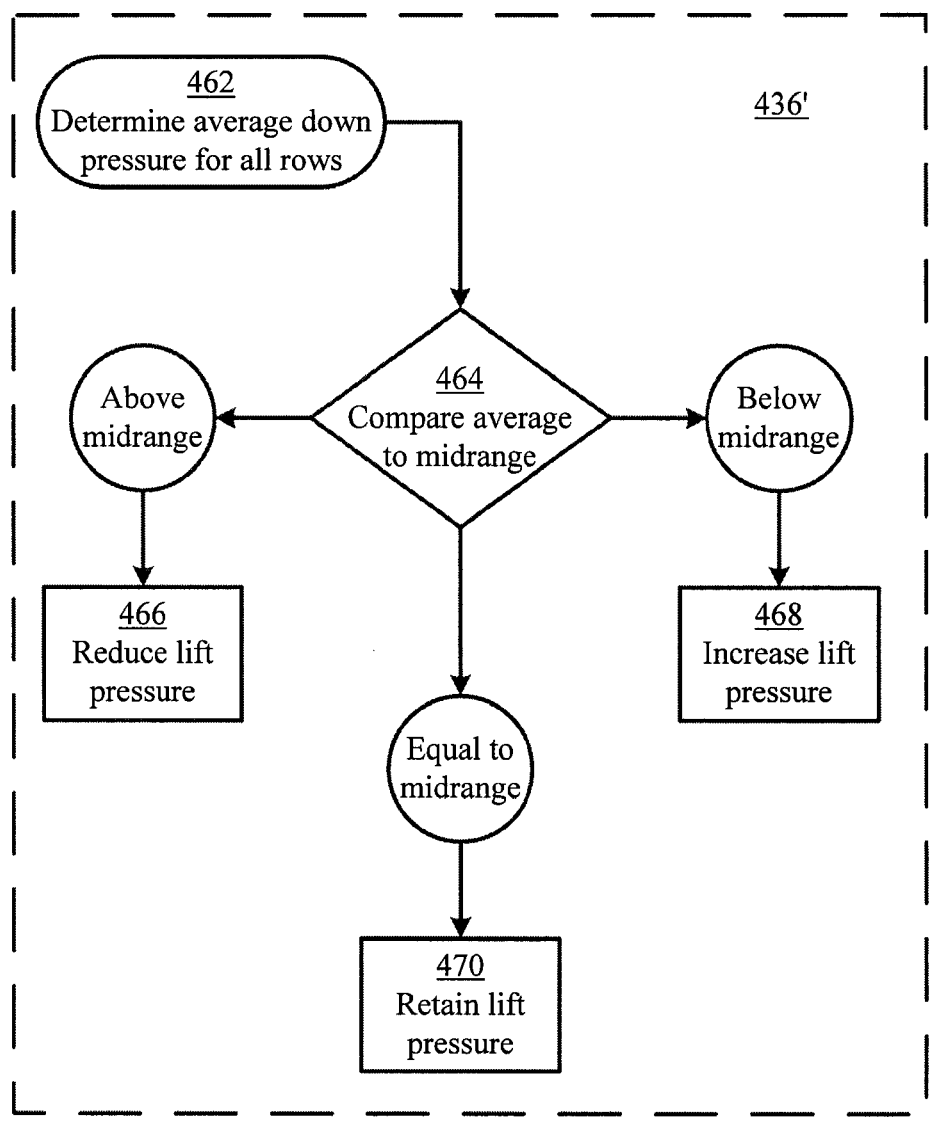
FIG. 4C illustrates another embodiment of a process flow for determining a lift pressure.
Figure 4D:
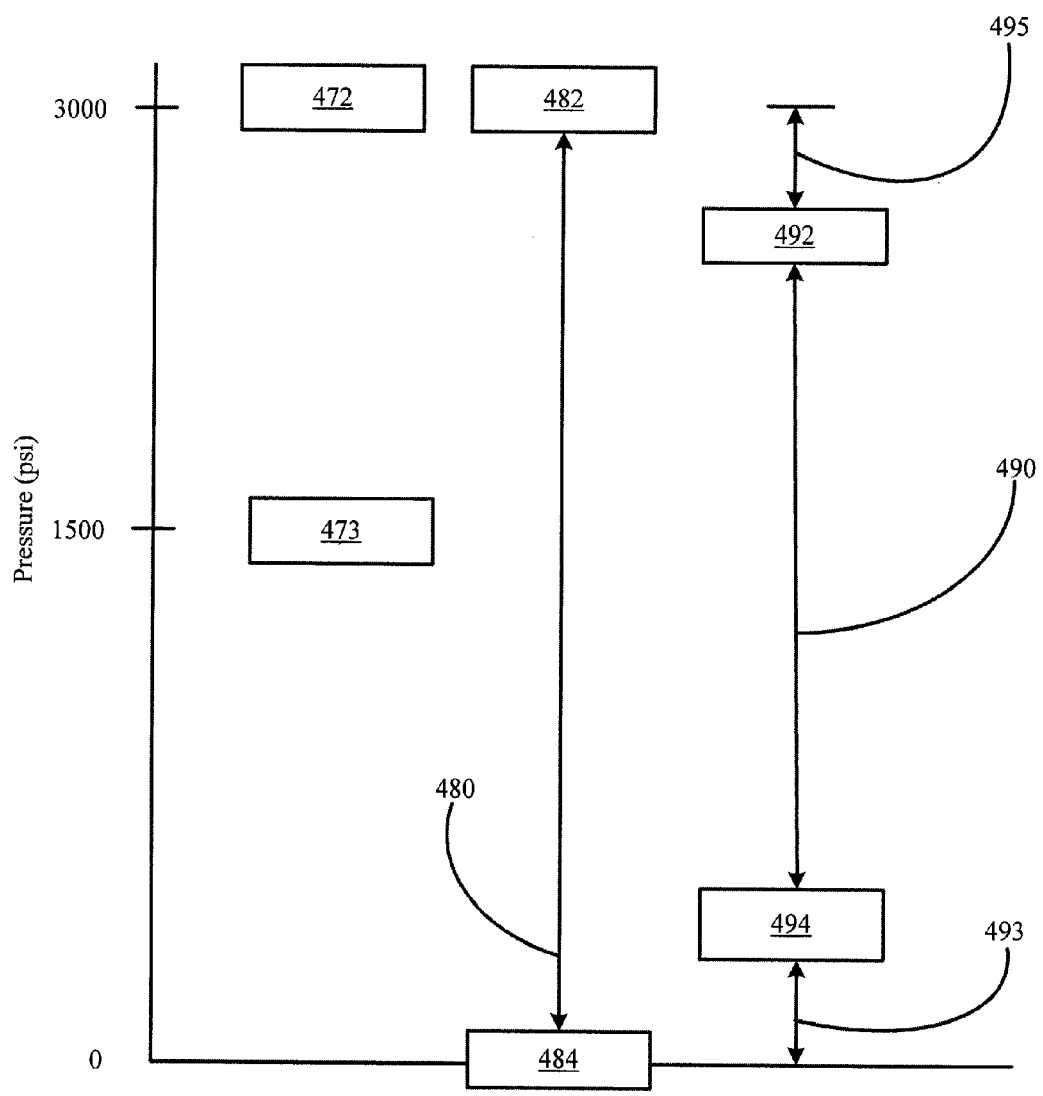
FIG. 4D illustrates pressure ranges for an actuator chamber.

In an alternative embodiment of process 450, rather than retaining the current lift pressure at step 436 when all rows are within the desired range, the system performs an alternative process 436' illustrated in FIG. 4C. At step 462, the monitor 42 averages the down pressure in the actuators 32. At step 464, the monitor 42 compares the average down pressure value to a midrange operating pressure 473 (FIG. 4D) associated with the actuators 32. In some embodiments, the midrange operating pressure 473 is one-half of the maximum operating pressure 472. If the average down pressure is below the midrange operating pressure 473, then at step 468 the monitor 42 commands an increase in lift pressure. Increasing the lift pressure will tend to increase the average down pressure in the actuators 32. Likewise, if the average down pressure is above the midrange operating pressure 473, then at step 466 the monitor 42 commands a reduction in lift pressure. Decreasing the lift pressure will tend to decrease the average down pressure in actuators 32. It should be appreciated in light of this disclosure that maintaining the average down pressure in actuators 32 at or near the midrange operating pressure 473 of the actuators will allow the system to react more effectively to changes in desired net pressure. Thus if the average down pressure is substantially equal to the midrange operating pressure 473, then at step 470 the monitor 42 retains the current lift pressure.

In the process 420 described above with reference to FIG. 4A, the lift pressure is obtained directly in a "feed forward" manner and used (in addition to the current downforce measurement) in determining a new commanded lift pressure. However, the step at step 406 of obtaining the current lift pressure could be eliminated in some embodiments of the process 420, resulting in a feedback system in which the effects of changes in lift pressure are taken into account after they affect the current downforce measurement. In such embodiments, the step of determining a desired net pressure at step 404 could also be eliminated such that the monitor 42 simply determines a new down pressure (or change in down pressure) based on the current downforce measurement.

Alternative Control Systems and Processes

In the system embodiments of FIGS. 3A and 3B, the down pressure is controlled individually while the lift pressure is controlled by a single control device. However, in other embodiments the lift pressure is controlled individually while the down pressure in all rows is controlled by a single control device. However, if one side of the actuator 32 is to be controlled on a per-row basis, it is preferable to control the down pressure chambers individually (as in FIGS. 3A and 3B) because maintaining depth by timely addition of downforce where necessary is more economically and agronomically important than timely removal of excess downforce.

In still other embodiments, both the lift and down pressures may be controlled individually by two pressure reducing-relieving valves associated with each row. Such embodiments involve significantly increased system cost as an additional valve must be used for each row on the planter. Likewise, the lift pressure may be controlled in common for any number of rows between two and the number of rows on the toolbar (e.g., the lift pressure may be controlled separately for each of three sections of the planter).

In other embodiments of the control system 300 illustrated in FIG. 3A, the lift control device 310 and the down pressure control devices 320 comprise electro-hydraulic flow control servo valves. In such embodiments, each flow control servo valve is preferably in electrical communication with the monitor 42. In still other embodiments, the lift control device 310 and the down pressure control devices 320 each comprise both an electro-hydraulic flow control servo valve and a pressure sensor in fluid communication with a pressure sensor. In such embodiments, each flow control servo valve and each pressure sensors are preferably in electrical communication with the monitor 42.

In the process 400 described above, the process 420 for controlling the down pressure comprises a feedback loop in which the input is the current downforce measurement from each row. However, it should be appreciated that in embodiments where the lift pressure in each actuator is controlled on a per-row basis and the down pressure is controlled by a common control device, the lift pressure is preferably determined by a feedback loop similar to process 420 using the current downforce measurement from each row. In such embodiments, the down pressure is preferably controlled by a process similar to process 450, but monitoring the lift pressure commanded to each row in order to determine and command a common down pressure.

In embodiments in which both the lift and down pressures of each actuator are controlled by individual control devices at each row, both the down and lift pressures of each actuator are preferably controlled by a process similar to process 420.

Figure 7:
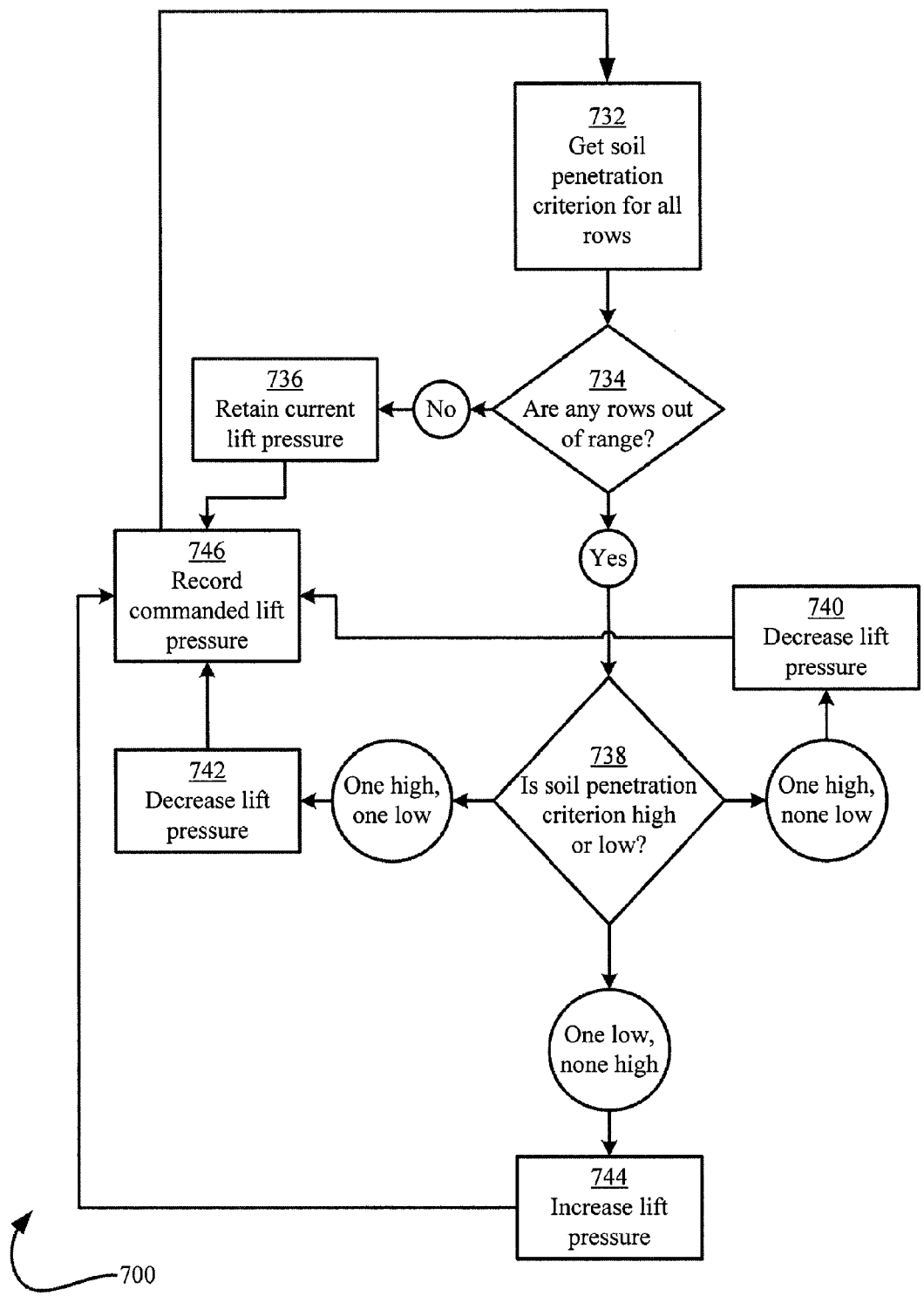
FIG. 7 illustrates yet another embodiment of a process flow for determining a lift pressure.
Figure 8:
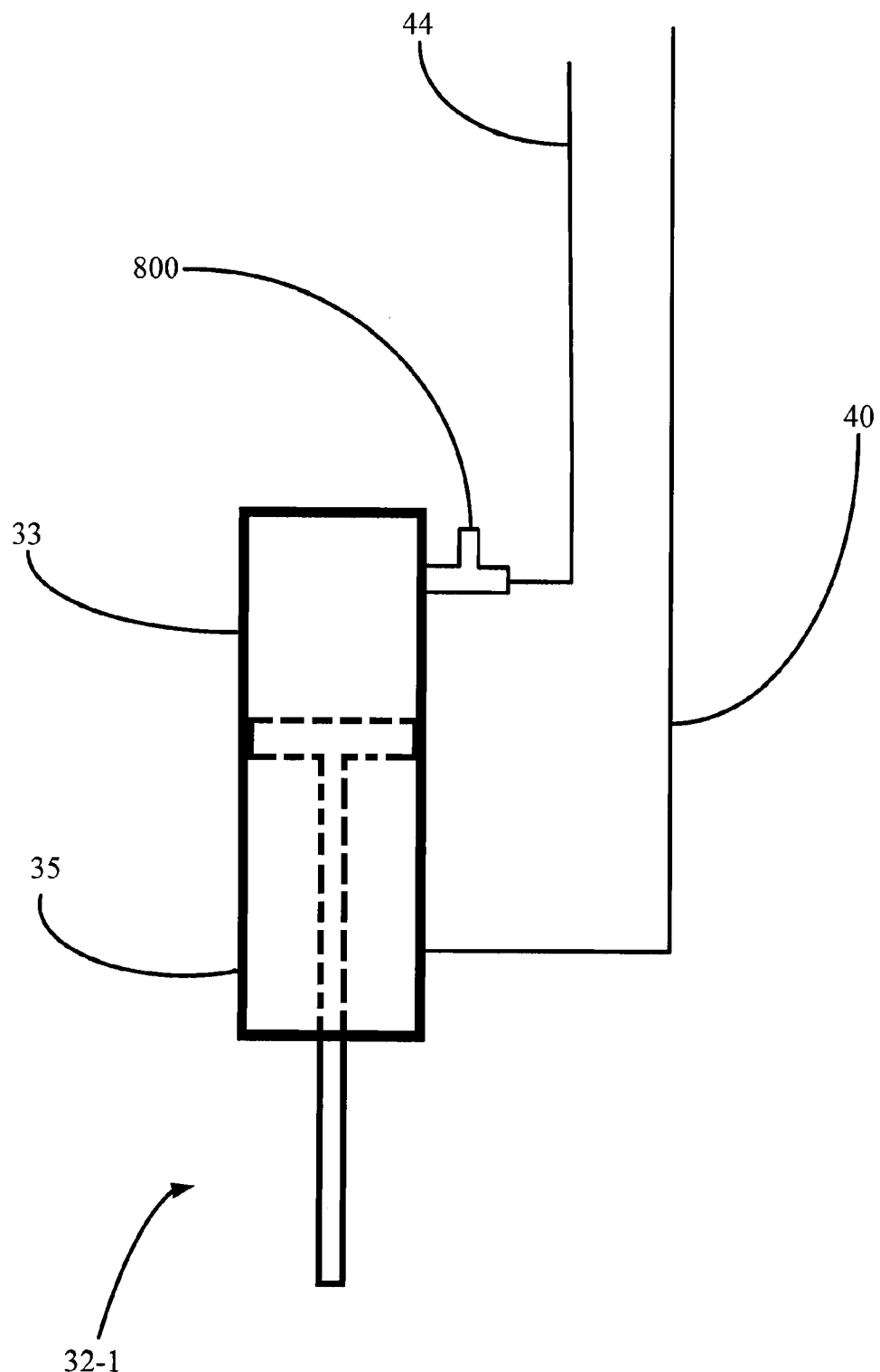
FIG. 8 is a schematic illustration of an embodiment of an actuator incorporating a pressure transducer.

As illustrated in the process 700 of FIG. 7, the lift pressure may be controlled by comparing any criterion related to soil penetration by the opener discs at each row to a desired range. It should be appreciated that in the embodiment of FIGS. 4A and 4B, the soil penetration criterion is equal to (or derived from) the commanded down pressure at each row. However, in other embodiments this criterion may be related to (or derived from) any of the following, without limitation: a net pressure command (as determined at step 404 of FIG. 4A), the reading from sensor 52 (indicating the vertical force on the gauge wheels 18 at each row), or the actual down pressure in the down pressure chamber 33 of each actuator 32 (measured, e.g., by a pressure transducer 800—such as those available from Gems Sensors and Controls in Plainville, Conn.—incorporated in each actuator as illustrated in FIG. 8). Whichever criterion is obtained at step 732, the criterion at each row is preferably compared to a desired range at step 734. If the soil penetration criterion is within range for all rows, then the current lift pressure is retained at step 736. If the soil penetration criterion is out of range for any row, then at step 738 the monitor 42 determines whether the soil penetration criterion is high or low for each row. If the soil penetration criterion for at least one row is high (indicating more force is needed to penetrate the soil to the desired depth) and is not low for any rows, then the lift pressure is decreased at step 740. If the soil penetration criterion for at least one row is low (indicating that more force is being applied than needed to penetrate the soil to the desired depth) and is not high for any rows, then the lift pressure is increased at step 744. If the soil penetration criterion for at least one row is low and is high for at least one other row, then the lift pressure is preferably decreased at step 742 because, as discussed herein, the economic cost of excess downpressure is generally less than that associated with lost depth. It should be appreciated that at step 742, the control system 300 chooses one of two undesirable actions (e.g., chooses to reduce the lift pressure rather than increase the lift pressure) based on an estimated economic or agronomic cost of both undesirable actions. In other embodiments, the relative economic cost of losing depth at a given number of rows is compared to the economic cost of excess downforce at another number of rows, and lift pressure is modified based on that comparison. In each case, at step 746 the commanded lift pressure is preferably stored in memory for use in determining the desired down pressure at each row (as illustrated in FIG. 4A).

While the process 700 determines appropriate lift pressure as described above, the desired down pressure at each row is preferably determined and commanded as described herein with respect to FIG. 4A. Thus it should be appreciated in light of this disclosure that where the soil penetration criterion is the reading from sensor 52 (i.e., vertical force on gauge wheels 18), a higher sensor reading will correspond to less penetration force required (and vice versa) such that the soil penetration criterion derived from the sensor reading is preferably inversely related to sensor reading and may be derived, e.g., by inverting the sensor reading.

It should be appreciated in light of this disclosure that although a given soil penetration criterion may be related to soil conditions such as soil hardness or moisture, such a criterion may change for constant soil conditions. For example, where the weight of an individual row unit 10 decreases due to discharge of crop inputs during planting operations, more supplemental force may be required to penetrate the soil with the opener discs 12. In addition, a soil penetration criterion may represent either a supplemental force required to penetrate the soil or an amount of applied force in excess of the force required to penetrate the soil; for example, in some embodiments the magnitude of a positive criterion may be related to the amount of additional force required to penetrate the soil, while the magnitude of a negative criterion may be related to the amount of applied force in excess of the force required to penetrate the soil. In some embodiments, the criterion may also be Boolean, e.g., it may have one of two values depending whether the soil has been penetrated to full depth; such embodiments may use a contact switch (e.g., disposed between the gauge wheel arms 36 and the stop 60) to determine whether any force is being exerted on the gauge wheels 18 by the ground.

It should also be appreciated in light of this disclosure that in alternative methods, multiple soil penetration criteria may be consulted in determining an appropriate lift pressure.

In addition, the magnitude of incremental adjustments made to the lift pressure and down pressure as described herein may be determined by a PID, PI or similar controllers as are known in the art.

Two-Stage Cylinder Downforce System

Figure 3C:
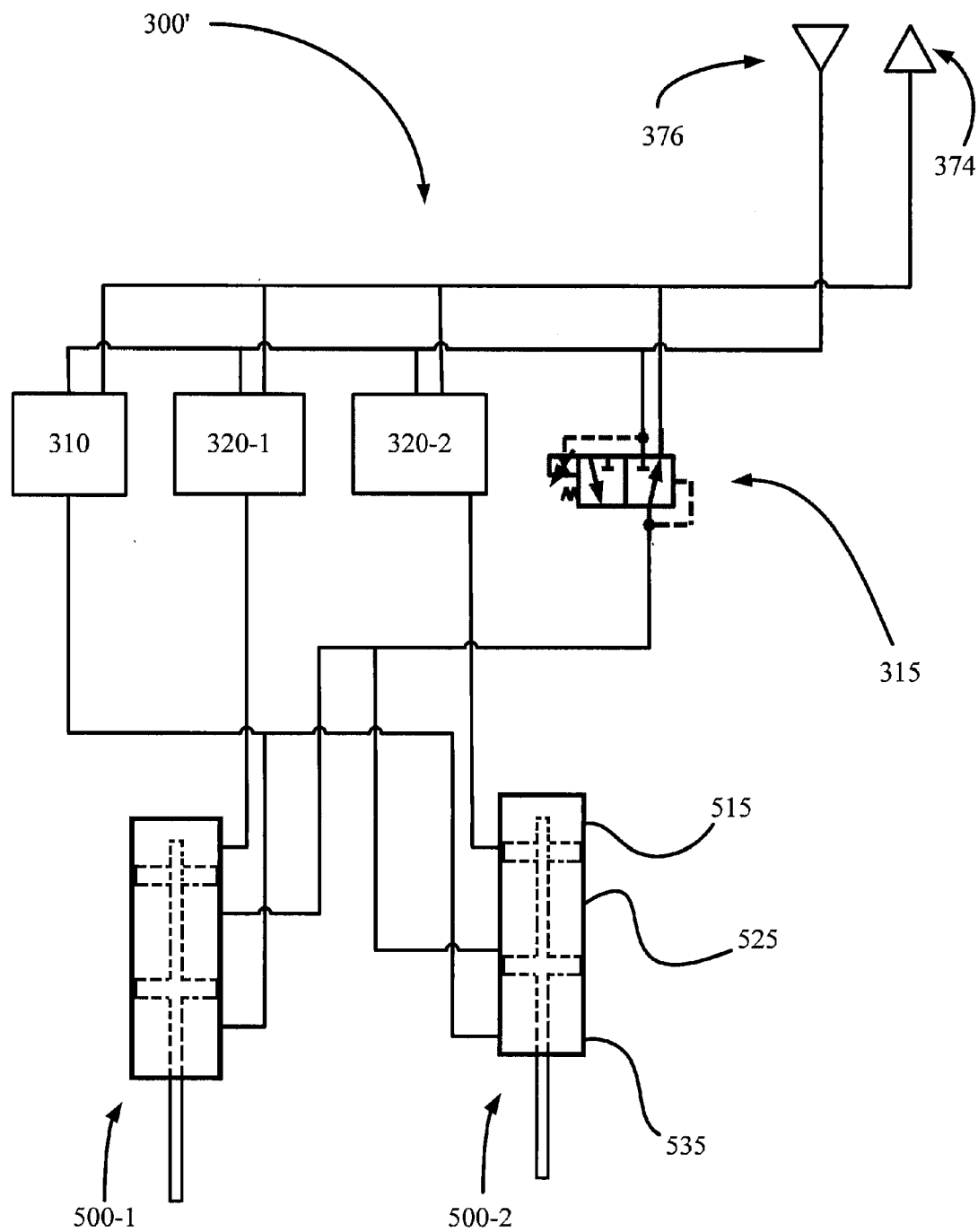
FIG. 3C is a schematic illustration of yet another embodiment of a downforce control system incorporating a two-stage actuator.

An alternative embodiment of the control system 300 is illustrated in FIG. 3C. Two rows are illustrated. In the control system 300' of FIG. 3C, each actuator 32 is replaced with a two-stage actuator 500. The two-stage actuator 500 includes a lift chamber 535, a primary down chamber 515 and a supplemental down chamber 525. The primary down chambers 515 of the two-stage actuators 500 are preferably in fluid communication with the fluid supply and fluid return ports 376,374 via individual down pressure control devices 320. The lift chambers 535 are preferably in fluid communication with the fluid supply and fluid return ports 376,374 via a common lift pressure control device 310. The supplemental down chambers 525 are preferably in fluid communication with the fluid supply and fluid return ports 376,374 via a common supplemental down pressure control device 315.

The control devices 310, 315, 320 may comprise pressure reducing-relieving valves. The monitor 42 is in electrical communication with the control devices 310, 315, 320, preferably by an electrical connection to a solenoid associated with each control device.

Figure 5A:
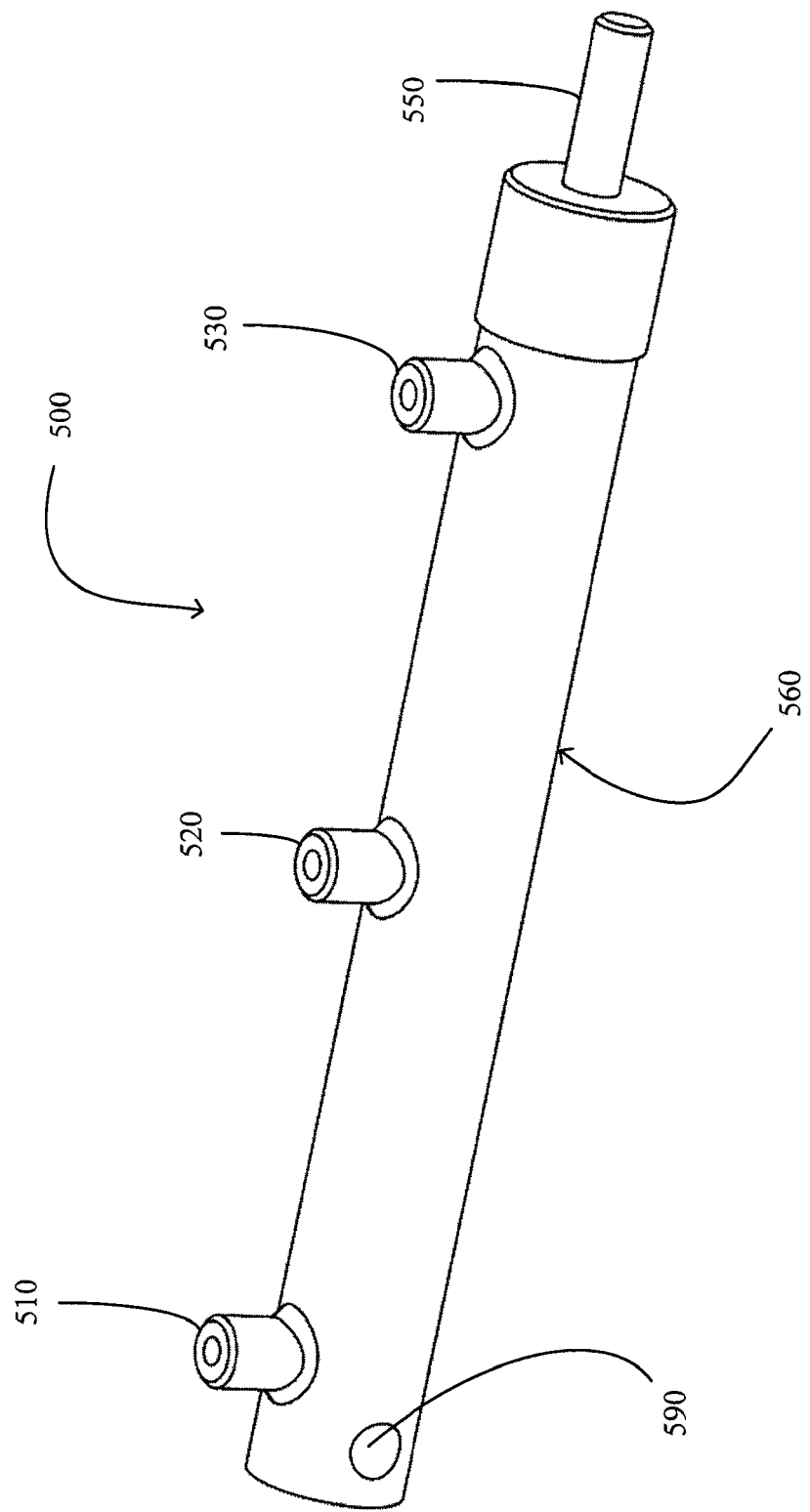
FIG. 5A is a perspective view of an embodiment of a two-stage actuator.
Figure 5B:
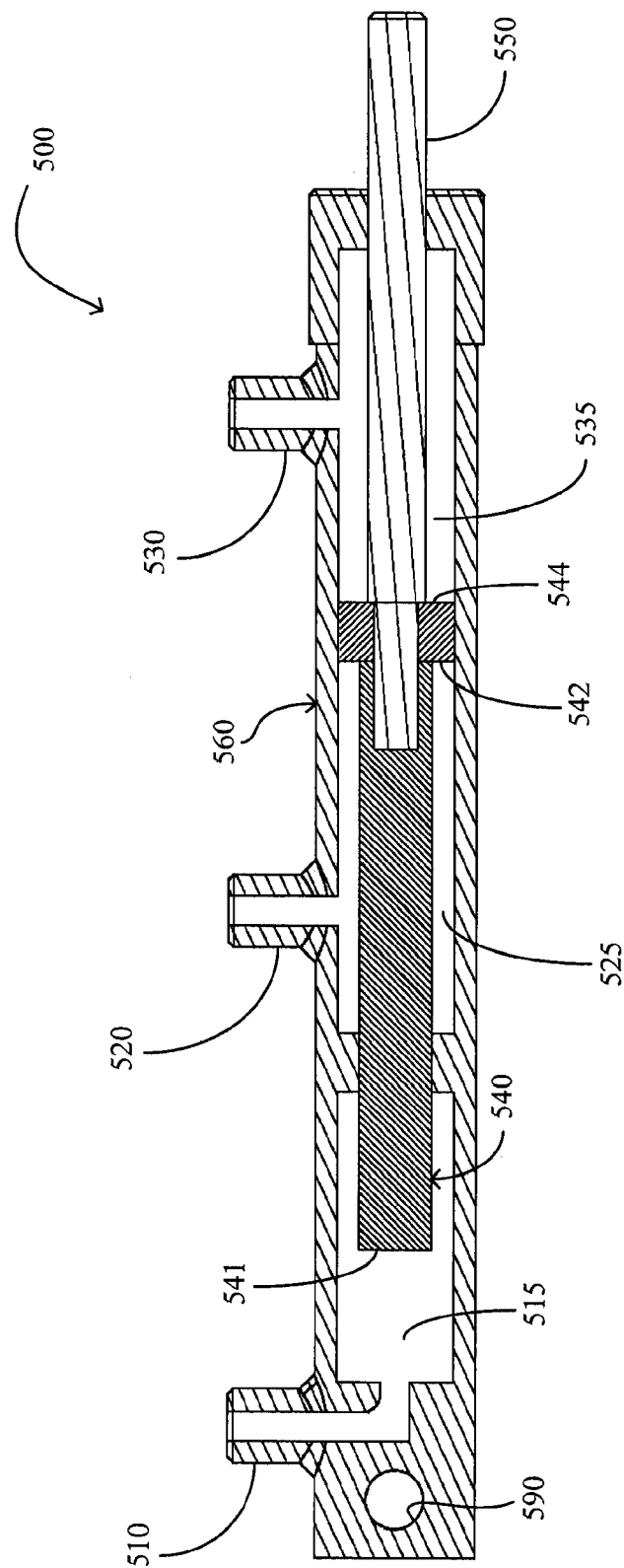
FIG. 5B is a cross-sectional view of the two-stage actuator of FIG. 5A.

The two-stage actuator 500 is illustrated in detail in FIGS. 5A and 5B. The actuator 500 includes a head 560 and a rod 550. The head 560 includes the primary down chamber 515 in fluid communication with a primary down chamber port 510, the supplemental down chamber 525 in fluid communication with a supplemental down chamber port 520, and the lift chamber 535 in fluid communication with a lift chamber port 530. The rod 550 is mounted to an inner rod 540. The inner rod 540 is slidingly received within the head 560. Inner rod 540 includes an upper annular surface 544 defining an upper surface of lift chamber 535. Inner rod 540 includes a lower annular surface 542 defining a lower surface of supplemental down chamber 525. Inner rod 540 also includes a primary down chamber surface 541 which extends into primary down chamber 525. Head 560 preferably includes a mounting hole 590 for attachment to the toolbar 2. As illustrated with respect to actuator 32 in FIG. 1A, rod 550 is preferably attached to the row unit 10 for transmission of vertical forces from the toolbar 2 to the row unit 10.

In operation of the two-stage actuator 500, as pressure increases in lift chamber 535, the increased pressure on the upper annular surface 544 creates an upward force on interior rod 540 and thus on rod 550. As pressure increases in primary down chamber 515, the increase pressure on the primary down chamber surface 541 creates a downward force on interior rod 540 and thus on rod 550. As pressure increases in supplemental down chamber 525, the increased pressure on the lower annular surface 542 creates a downward force on interior rod 540 and thus on rod 550.

Figure 5C:
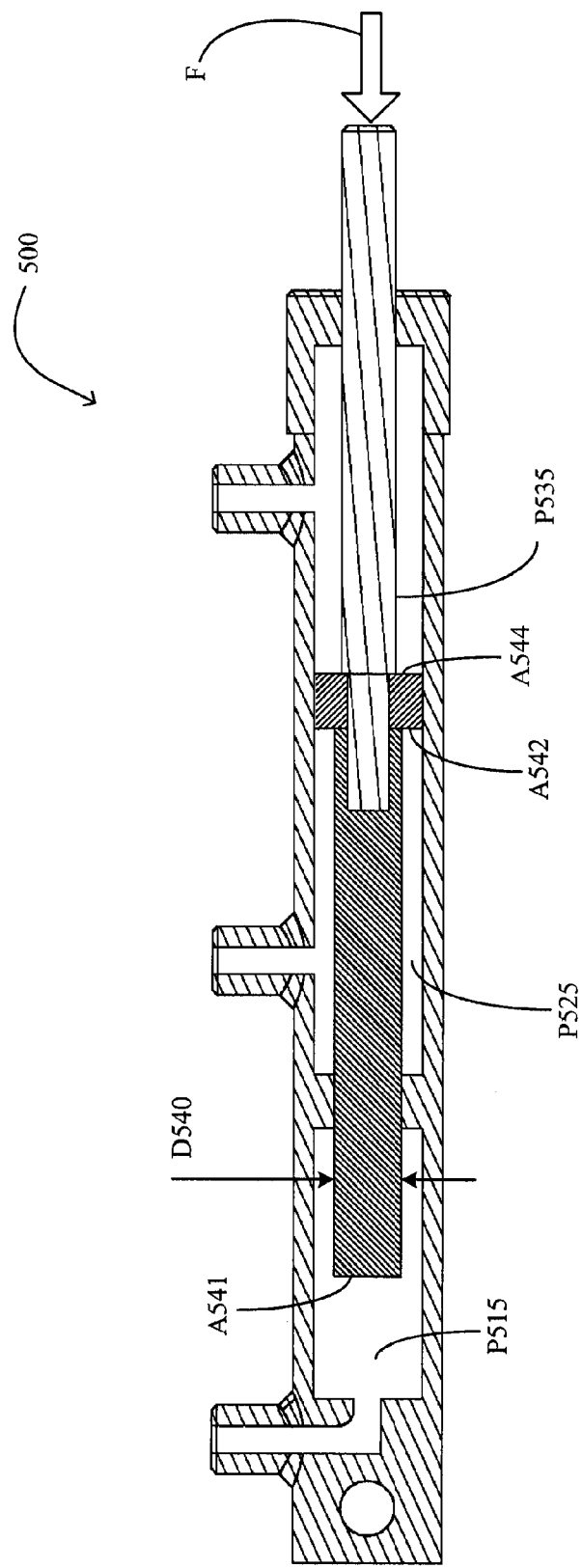
FIG. 5C is a cross-sectional view of the two-stage actuator of FIG. 5A.

Referring to FIG. 5C, the surfaces 541,542,544 have surface areas A541, A542, A544, respectively. Likewise, the variable pressures of fluid in chambers 515, 525, 535 are indicated by reference numerals P515, P525, P535, respectively. Thus, a net vertical force F on the rod 550 may be expressed as follows:

$$F = P_{515}A_{541} + P_{525}A_{542} - P_{535}A_{544}$$

It should be appreciated in light of this disclosure that the two-stage actuator 500 allows the control system to operate with less cumulative fluid flow. Smaller, more frequent adjustments in net vertical force F may be made by adjusting the primary down pressure, while larger adjustments in downforce may be made by adjusting the supplemental down pressure when necessary. As a diameter D540 of inner rod 540 increases (i.e., as area A541 increases and area A542 decreases), the maximum variable per-row downforce increases and the amount of flow shared between the cylinders 500 decreases.

Two-Stage Cylinder Control Methods

In operation of the control system 300' of FIG. 3C, the primary down pressure control device 310 provides an individual primary down pressure to each actuator 500. When the desired total down pressure for any row is greater than the pressure that can be provided by the individual head pressure, the supplemental down pressure control device 315 increases the common supplemental down pressure in supplemental down pressure chamber 525 for all rows. As with the control system of FIGS. 3A and 3B, when the desired total down pressure for any row is negative, the lift pressure control device 310 increases the common lift pressure in lift pressure chamber 535 for all rows.

Figure 6A:
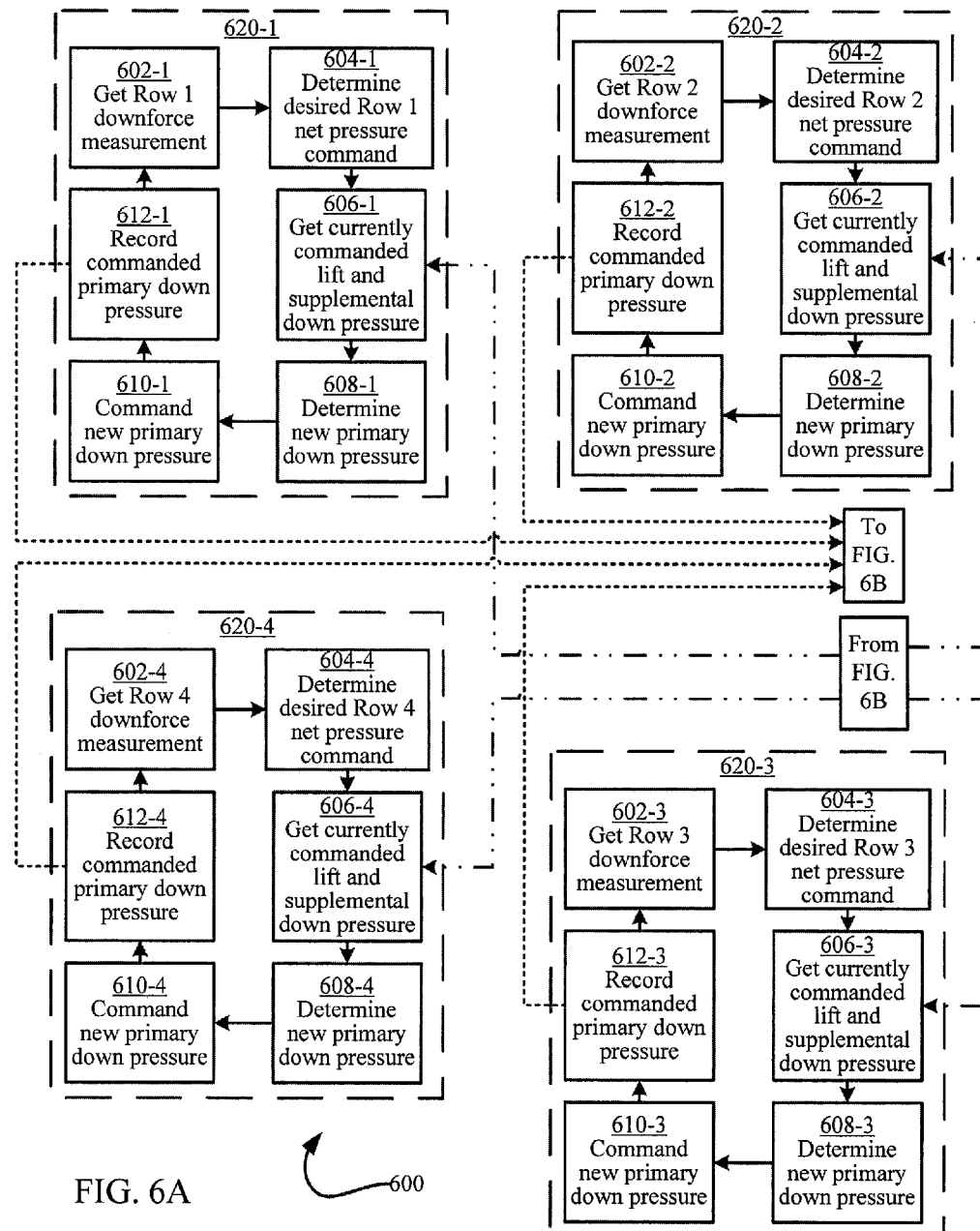
FIG. 6A illustrates another embodiment of a process flow for determining a down pressure.
Figure 6B:
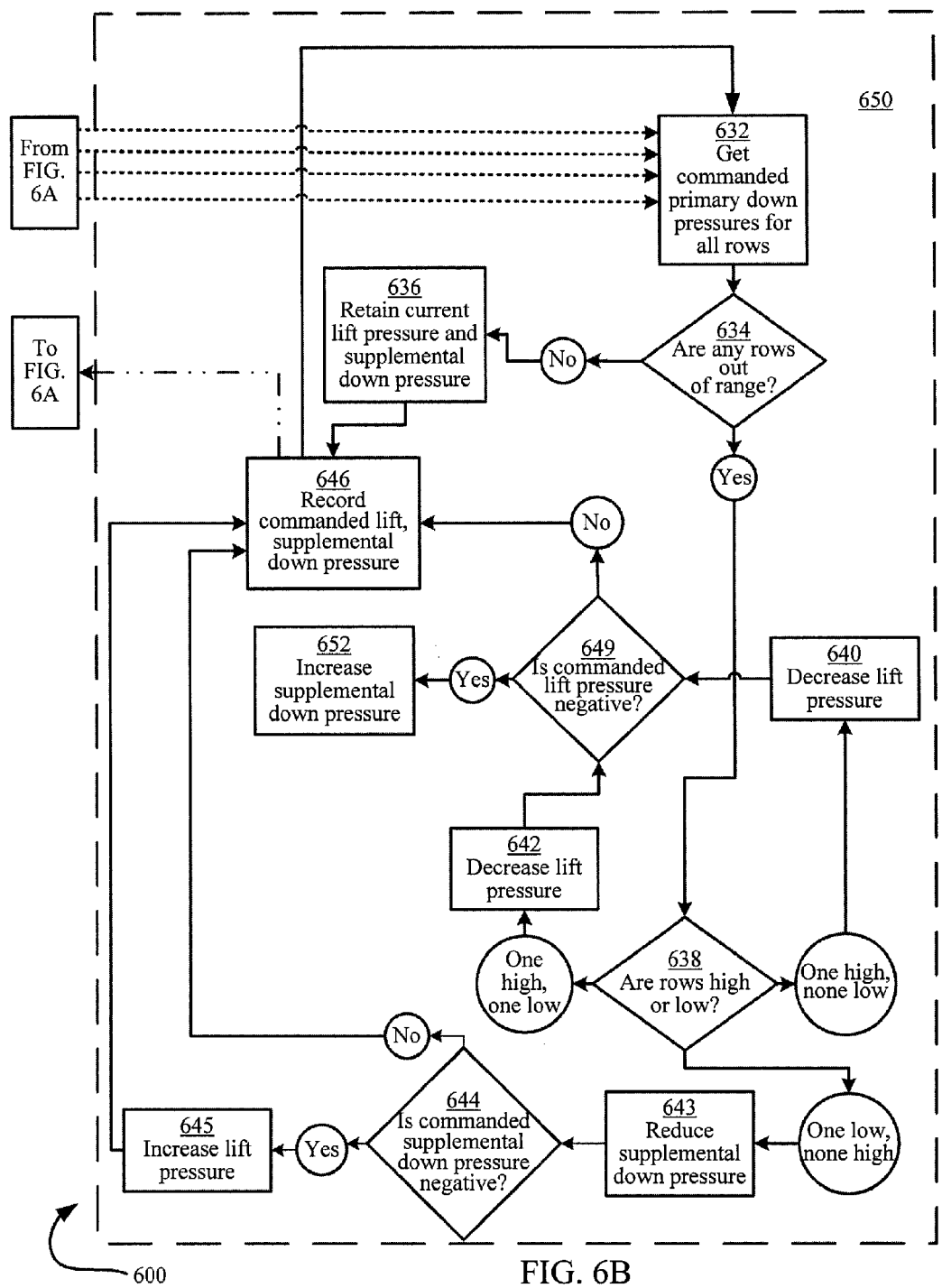
FIG. 6B illustrates another embodiment of a process flow for determining a lift pressure.

A preferred process 600 of controlling the control system 300' of FIG. 3C is illustrated in FIGS. 6A and 6B.

Referring to FIG. 6A, processes 620 are used to command a primary down pressure for each row based on the downforce measurement at that row and preferably based on the lift and supplemental down pressures fed forward from the process 650 (FIG. 6B). At step 602, the monitor 42 obtains the current downforce measurement for the row from the associated sensor 52. At step 604, the monitor 42 determines a desired net pressure preferably based on the current downforce measurement. The net pressure is the sum of the down pressures in the primary and supplemental down chambers 515,525 less the lift pressure in the lift chamber 535. In order to determine the primary down pressure required to obtain the desired net pressure, the monitor 42 obtains the currently commanded lift pressure and supplemental down pressure at step 606. At step 608, the monitor 42 determines a commanded primary down pressure based on the currently commanded primary down pressure and lift pressure and the desired net pressure. At step 610, the monitor 42 sends a command signal to the control device 320 related to the commanded primary down pressure. At step 612, the monitor 42 preferably stores the new commanded primary down pressure in memory. It should be appreciated that the processes 620 are similar to the processes 420 described herein except that both the commanded lift pressure and supplemental down pressure are consulted and a primary down pressure is commanded.

Turning to FIG. 6B, a process 650 for determining lift pressure and supplemental down pressure is illustrated. At step 632, the monitor 42 obtains the currently commanded primary down pressure for each row. The currently commanded primary down pressure is preferably stored in memory by the process 620 as discussed herein with respect to FIG. 6A. At step 634, the monitor 42 determines whether the primary down pressure in any of the actuators 500 is outside of a desired range. The desired range may be similar to any of the desired ranges described with respect to FIG. 4D, except that the desired range is associated with the primary down pressure chamber 515. If the primary down pressure is within the desired range for all actuators, then at step 636 the monitor 42 preferably retains the currently commanded supplemental down pressure and lift pressure and at step 646 preferably stores the currently commanded supplemental down pressure and lift pressure in memory.

If the down pressure is outside the desired range for at least one actuator, then at step 638 the monitor 42 determines whether one or more rows are above or below the desired range. If at least one row is below the desired range and no rows are above the desired range, then at step 643 the monitor 42 preferably reduces the commanded supplemental down pressure. At step 644, the monitor 42 determines whether the commanded supplemental down pressure is negative. If the commanded supplemental down pressure is negative, then at step 645 the monitor 42 preferably increases the commanded lift pressure and at step 646 preferably stores the currently commanded lift pressure and supplemental down pressure in memory. If the commanded supplemental down pressure is not negative, then at step 646 the monitor 42 preferably stores the currently commanded lift pressure and supplemental down pressure in memory without adjusting the commanded supplemental down pressure.

If at least one row is above the desired range and no rows are below the desired range, then at step 640 the monitor 42 preferably commands a decrease in lift pressure. At step 649, the monitor 42 preferably determines whether the resulting commanded lift pressure is negative. If the currently commanded lift pressure is negative, then at step 652 the monitor 42 preferably commands an increase in supplemental down pressure and at step 646 preferably stores the currently commanded supplemental down pressure and lift pressure in memory. If the currently commanded lift pressure is not negative, then at step 646 the monitor 42 preferably stores the currently commanded supplemental down pressure and lift pressure in memory without modifying the supplemental down pressure.

If at least one row is above the desired range and at least one row is below the desired range, then at step 642 the monitor 42 preferably commands a decrease in lift pressure. At step 649, the monitor 42 preferably determines whether the resulting commanded lift pressure is negative. If the currently commanded lift pressure is negative, then at step 652 the monitor 42 preferably commands an increase in supplemental down pressure and at step 646 preferably stores the currently commanded supplemental down pressure and lift pressure in memory. If the currently commanded lift pressure is not negative, then at step 646 the monitor 42 preferably stores the currently commanded supplemental down pressure and lift pressure in memory without modifying the supplemental down pressure.

It should be appreciated in light of this disclosure that the process 650 preferably does not pressurize the lift pressure chambers and supplemental down pressure chambers simultaneously. Process 650 reduces the supplemental down pressure to zero before increasing the lift pressure. As the commanded lift pressure becomes more negative, the lift pressure determined at step 645 increases. Likewise, process 650 reduces the lift pressure to zero before increasing the supplemental down pressure. As the commanded lift pressure becomes more negative, the supplemental down force determined at step 652 increases.

Regenerative Control Systems

As discussed above, the control system 300' of FIG. 3C provides either a common lift pressure or a common supplemental down pressure to all rows. In some scenarios, the monitor 42 may determine that lift pressure is required when supplemental down pressure is currently being applied, and vice versa. In order to decrease the time and fluid flow required to stop applying supplemental down pressure and start applying lift pressure (or vice versa), the control system 300" of FIG. 3D selectively allows regeneration (i.e., direct flow) between the supplemental down chambers 525 and the lift chambers 535.

Figure 3D:
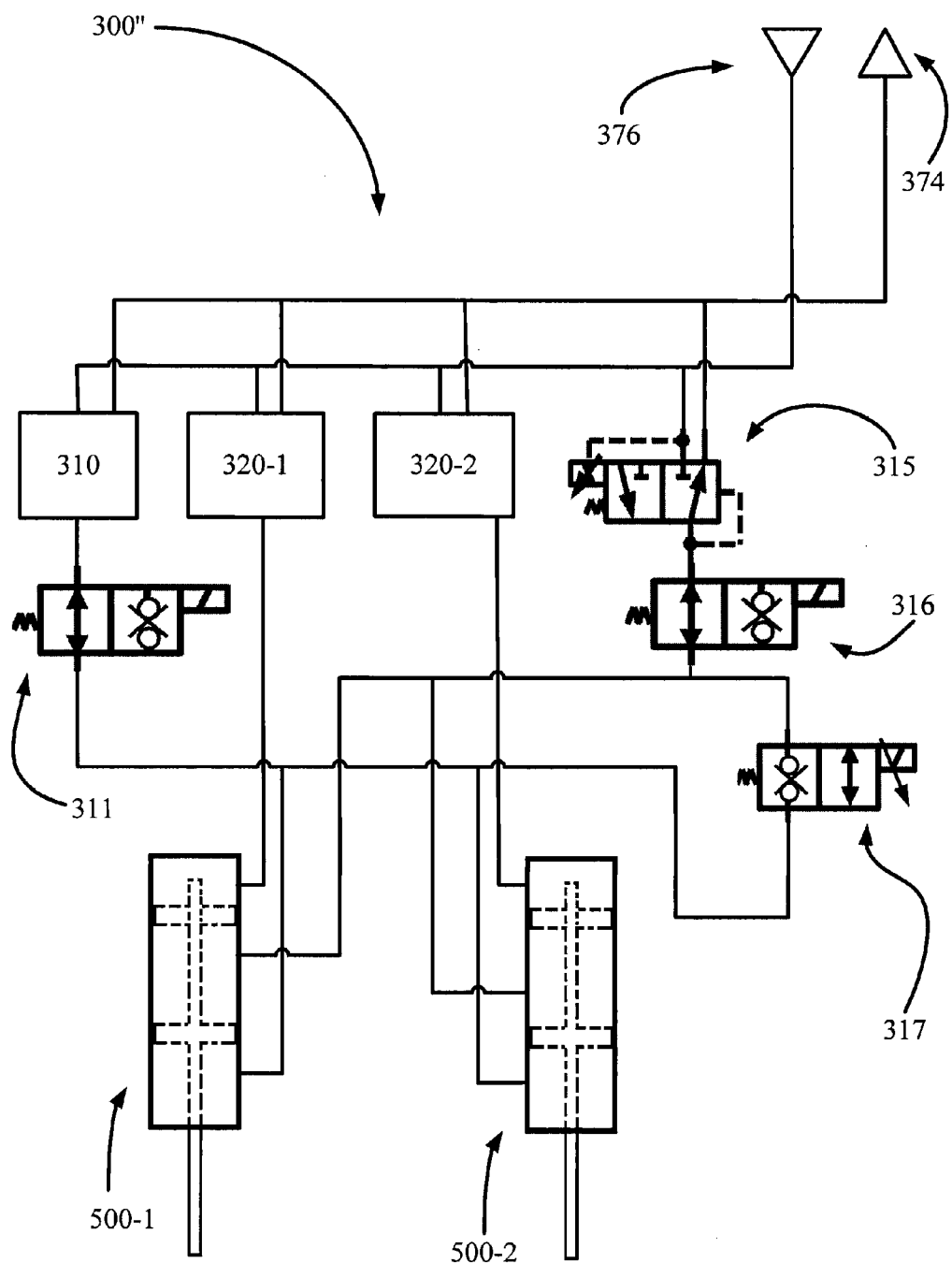
FIG. 3D is a schematic illustration of yet another embodiment of a downforce control system incorporating a two-stage actuator and a regeneration circuit.

In the control system 300" of FIG. 3D, the supplemental down chambers are placed in fluid communication by a control device 317. The control device 317 is preferably a solenoid-operated bi-directional poppet and flow control valve, but in some embodiments comprises a fixed orifice. A control device 311 is in fluid communication with the lift pressure control device 310 and the lift chambers 535. A control device 316 is in fluid communication with the supplemental down pressure control device 315 and the supplemental down chambers 525. The control devices 311, 316 are preferably solenoid-operated bi-directional poppet valves such as Model No. SV08-28 available from Hydraforce in Lincolnshire, Ill. The solenoids of the control devices 311, 316, 317 are in electrical communication with the monitor 42.

In operation of the control system 300" of FIG. 3D, the monitor 42 modifies operating parameters of control devices 311,316,317 in order to allow flow between the supplemental down chambers 525 and the lift chambers 535. To allow fluid to flow from the supplemental down chamber 525 to the lift chamber 535, the control device 311 is opened (or remains open), control device 316 is closed, and control device 317 is opened. To allow fluid to flow from the lift chamber 535 to the supplemental down chamber 525, the control device 311 is closed, control device 316 is opened (or remains open), and control device 317 is opened. In order to prevent regenerative flow, the control device 317 is closed and control devices 311,316 are opened (or remain open), effectively converting the control system 300" of FIG. 3D to control system 300 of FIG. 3C.

Although the systems, methods and apparatus disclosed herein are primarily described as hydraulic, it should be appreciated that the instant disclosure could be used to implement a similar pneumatic system. For example, in some embodiments the cylinders described herein are replaced with pneumatic cylinders or air bags and the valves described herein are replaced with pneumatic valves having equivalent functionality. It should also be understood that the planter 1 with row units 10 could be any agricultural implement with laterally spaced units that move vertically with respect to toolbar and where it is desired to have variable downforce for the laterally spaced units.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. An agricultural implement having multiple row units, each row unit comprising opening discs for opening a trench in soil and gauge wheels for setting a depth of the trench, and having a system for applying downforce to the row units, the system comprising:

a first actuator, said first actuator disposed to apply force to a first row unit, said first actuator including a first down chamber and a first lift chamber, pressure in said first down chamber tending to oppose pressure in said first lift chamber;

a second actuator, said second actuator disposed to apply force to a second row unit, said second actuator including a second down chamber and a second lift chamber, pressure in said second down chamber tending to oppose pressure in said second lift chamber;

a first downpressure control device in fluid communication with said first down chamber for controlling pressure in said first down chamber, said first downpressure control device configured to maintain as a selected first downpressure any one of a continuous range of pressures in said first downpressure chamber;

a second downpressure control device in fluid communication with said second down chamber for controlling pressure in said second down chamber, said second downpressure control device configured to maintain as a selected second downpressure any one of a continuous range of pressures in said second downpressure chamber, wherein said selected second downpressure is different from said selected first downpressure;

a lift pressure control device in fluid communication with both said first lift chamber and said second lift chamber for controlling pressure in said first lift chamber and said second lift chamber, said lift pressure control device configured to maintain as a selected lift pressure any one of a continuous range of pressures in both said first lift chamber and said second lift chamber.

2. The agricultural implement of claim 1, further comprising:

processing circuitry in electrical communication with said first downpressure control device, said second downpressure control device, and said lift pressure control device, said processing circuitry configured to modify an operating state of said first downpressure control device, said second downpressure control device, and said lift pressure control device, wherein said processing circuitry is further configured to:

determine a first soil penetration criterion associated with said first row unit;

determine a second soil penetration criterion associated with said second row unit;

determine whether either said first soil penetration criterion or said second soil penetration criterion exceeds a predetermined range; and reduce pressure in said first lift chamber and said second lift chamber when either said first soil penetration criterion or said second soil penetration criterion exceeds said predetermined range.

3. The agricultural implement of claim 2, further including:

a first downforce sensor associated with said first row unit, said first downforce sensor in electrical communication with said processing circuitry, said first downforce sensor configured to generate a first downforce signal related to a force between the ground and said first row unit; and a second downforce sensor associated with said second row unit, said second downforce sensor in electrical communication with said processing circuitry, said second downforce sensor configured to generate a second downforce signal related to a force between the ground and said second row unit.

4. The agricultural implement of claim 3, wherein said processing circuitry is further configured to:

select and command a pressure in said first down chamber based on said first downforce signal; and select and command a pressure in said second down chamber based on said second downforce signal.

5. The agricultural implement of claim 2, further including:

a first downforce sensor associated with said first row unit, said first downforce sensor in electrical communication with said processing circuitry, said first downforce sensor configured to generate a first downforce signal related to a force between the ground and said first row unit; and a second downforce sensor associated with said second row unit, said second downforce sensor in electrical communication with said processing circuitry, said second downforce sensor configured to generate a second downforce signal related to a force between the ground and said second row unit, wherein said processing circuitry is further configured to determine a pressure in said first down chamber based on said first downforce signal and to determine a pressure in said second down chamber based on said second downforce signal.

6. The agricultural implement of claim 5, wherein:

said first soil penetration criterion selected from one of: the pressure in said first down chamber, the pressure in said first down chamber less the pressure in said first lift chamber, and said first downforce signal; and said second soil penetration criterion selected from one of: the pressure in said second down chamber, the pressure in said second down chamber less the pressure in said second lift chamber, and said second downforce signal.

7. The agricultural implement of claim 5, wherein said processing circuitry is further configured to:

determine whether either said first soil penetration criterion or said second soil penetration criterion is less than a predetermined range; and increase pressure in said first lift chamber and said second lift chamber when either said first soil penetration criterion or said second soil penetration criterion is less than said predetermined range and when neither said first soil penetration criterion nor said second soil penetration criterion exceeds said predetermined range.

8. The agricultural implement of claim 7, wherein said first downforce sensor comprises a load-sensing pin.

9. The agricultural implement of claim 7, wherein said processing circuitry is further configured to retain the pressure in said first down chamber and said second down chamber when both said first soil penetration criterion and said second soil penetration criterion are within said predetermined range.

10. The agricultural implement of claim 2, wherein said processing circuitry is further configured to:

determine whether either said first soil penetration criterion or said second soil penetration criterion is less than a predetermined range; and increase pressure in said first lift chamber and said second lift chamber when either said first soil penetration criterion or said second soil penetration criterion is less than said predetermined range and when neither said first soil penetration criterion nor said second soil penetration criterion exceeds said predetermined range.

11. A method of controlling the force applied to a first agricultural row unit by a first actuator having a first chamber and a second chamber and of controlling the force applied to a second agricultural row unit by a second actuator having a third chamber and a fourth chamber, the first and second agricultural row units including opening discs for opening a trench in soil and gauge wheels for setting a depth of the trench, the method comprising:

maintaining a first selected pressure in the first chamber by modifying an operating state of a first control device in fluid communication with the first chamber;

maintaining a second selected pressure in the third chamber by modifying an operating state of a second control device in fluid communication with the third chamber;

determining a first soil penetration criterion associated with the first row unit;

determining a second soil penetration criterion associated with the second row unit;

determining whether either said first soil penetration criterion or said second soil penetration criterion exceeds a predetermined range; and reducing a third selected pressure when either said first soil penetration criterion or said second soil penetration criterion exceeds said predetermined range.

12. The method of claim 11, further including:

maintaining said third selected pressure in the second chamber and the fourth chamber by modifying an operating state of a third control device in fluid communication with the second chamber and the fourth chamber, wherein said third selected pressure is different from said first selected pressure and said second selected pressure.

13. The method of claim 12, further including:
generating a first downforce signal related to a force between the ground and the first row unit;
generating a second downforce signal related to a force between the ground and the second row unit;
selecting and commanding a pressure in the first chamber based on said first downforce signal; and
selecting and commanding a pressure in the third chamber based on said second downforce signal.

14. The method of claim 13, wherein:
said first soil penetration criterion selected from one of: the pressure in the first chamber, the pressure in the first chamber less the pressure in the second chamber, and said first downforce signal; and
said second soil penetration criterion selected from one of: the pressure in the third chamber, the pressure in the third chamber less the pressure in the fourth chamber, and said second downforce signal.

15. The method of claim 12, further including:
determining whether either said first soil penetration criterion or said second soil penetration criterion is less than a predetermined range; and
increasing said third pressure when either said first soil penetration criterion or said second soil penetration criterion is less than said predetermined range and when neither said first soil penetration criterion nor said second soil penetration criterion exceeds said predetermined range.

16. The method of claim 15, further including:
retaining said third pressure when both said first soil penetration criterion and said second soil penetration criterion are within said predetermined range.

17. The method of claim 16, wherein said first chamber and said third chamber are down chambers of said first and second actuators, respectively, and wherein said second chamber and said fourth chamber are lift chambers of said first and second actuators, respectively.

18. The method of claim 12, wherein said third selected pressure is different from said first selected pressure and said second selected pressure.

19. The method of claim 11, further including:
generating a first downforce signal related to a force between the ground and the first row unit; and
generating a second downforce signal related to a force between the ground and the second row unit.

20. The method of claim 19, further including:
selecting and commanding a pressure in the first chamber based on said first downforce signal; and
selecting and commanding a pressure in the third chamber based on said second downforce signal.

* * * * *